United States Patent
Sawaki et al.

(10) Patent No.: US 9,800,623 B2
(45) Date of Patent: Oct. 24, 2017

(54) RELAY DEVICE, RELAY METHOD AND INFORMATION PROCESSING SYSTEM

(71) Applicant: FeliCa Networks, Inc., Tokyo (JP)

(72) Inventors: Ryo Sawaki, Saitama (JP); Shinichi Kato, Tokyo (JP)

(73) Assignee: FeliCa Networks, Inc., Tokyo (JP)

(*) Notice: Subject to any disclaimer, the term of this patent is extended or adjusted under 35 U.S.C. 154(b) by 147 days.

(21) Appl. No.: 14/622,048

(22) Filed: Feb. 13, 2015

(65) Prior Publication Data

US 2015/0271212 A1    Sep. 24, 2015

(30) Foreign Application Priority Data

Mar. 19, 2014 (JP) ................. 2014-056282

(51) Int. Cl.
H04L 12/66 (2006.01)
H04L 29/06 (2006.01)
H04L 29/08 (2006.01)

(52) U.S. Cl.
CPC ........ H04L 65/1069 (2013.01); H04L 67/141 (2013.01)

(58) Field of Classification Search
CPC ............. H04L 65/1059; H04L 65/1069; H04L 65/1066; H04L 67/141
USPC ....................................... 370/352
See application file for complete search history.

(56) References Cited

U.S. PATENT DOCUMENTS

2008/0080480 A1* 4/2008 Buckley ............... H04L 12/66
370/352
2012/0023247 A1* 1/2012 Minamizawa ...... G06F 21/6263
709/229

* cited by examiner

*Primary Examiner* — Mang Yeung
(74) *Attorney, Agent, or Firm* — Paratus Law Group, PLLC

(57) ABSTRACT

Provided is a relay device including a communication control unit configured to control communication with an external device. The communication control unit maintains a session with an information processing apparatus that transmits first information when the first information including specific information that is able to specify a calling party in a voice call is acquired by communication, causes second information including the specific information included in the first information to be transmitted to a first external device, specifies the information processing apparatus having transmitted the first information on the basis of the specific information included in acquired third information when the third information including the specific information and information for transmission is acquired from the first external device or a second external device after the second information is transmitted, and causes information included in the third information to be transmitted to the specified information processing apparatus by the maintained session.

10 Claims, 11 Drawing Sheets

RELAY DEVICE, RELAY METHOD AND INFORMATION PROCESSING SYSTEM

CROSS REFERENCE TO RELATED APPLICATIONS

This application claims the benefit of Japanese Priority Patent Application JP 2014-056282 filed Mar. 19, 2014, the entire contents of which are incorporated herein by reference.

BACKGROUND

The present disclosure relates to a relay device, a relay method and an information processing system.

A technology of facilitating the acquisition of information to acquire a program to access data used in a predetermined service has been developed. As the above-mentioned technology, for example, there is a technology described in JP 2006-318453A.

SUMMARY

For example, the user who uses an information processing apparatus such as a smart phone, a mobile phone and a tablet device can cause the information processing apparatus to accommodate a new service by operating the information processing apparatus and causing the information processing apparatus to communicate with an external device such as a server of a service provider. Moreover for example, the user can cause the information processing apparatus to acquire various kinds of information (data) by operating the information processing apparatus and causing the information processing apparatus to communicate with the external device. Here, in a case where the information processing apparatus is caused to accommodate a new service or in a case where the information processing apparatus is caused to acquire information, depending on the character of service and the kind of acquired information, for example, the user is requested to perform operation according to a UI (User Interface) in order to input private information such as the name and the address.

However, for example, it may be difficult for a low-literate user to perform complicated operation using a touch panel and various buttons, and so on. Therefore, for example, it is desired to be able to cause the information processing apparatus to accommodate a new service and acquire various kinds of information more easily.

In the present disclosure, there are suggested a new, improved relay device, relay method and information processing system that can achieve the improvement of user's convenience.

According to an embodiment of the present disclosure, there is provided a relay device including a communication control unit configured to control communication with an external device. The communication control unit maintains a session with an information processing apparatus that transmits first information when the first information including specific information that is able to specify a calling party in a voice call is acquired by communication, causes second information including the specific information included in the first information to be transmitted to a first external device, specifies the information processing apparatus having transmitted the first information on the basis of the specific information included in acquired third information when the third information including the specific information and information for transmission is acquired from the first external device or a second external device after the second information is transmitted, and causes information included in the third information to be transmitted to the specified information processing apparatus by the maintained session.

According to an embodiment of the present disclosure, there is provided a relay method executed by a relay device, the method including control of communication with an external device. The control includes maintaining a session with an information processing apparatus that transmits first information when the first information including specific information that is able to specify a calling party in a voice call is acquired by communication, causing second information including the specific information included in the first information to be transmitted to a first external device, specifying the information processing apparatus having transmitted the first information on the basis of the specific information included in acquired third information when the third information including the specific information and information for transmission is acquired from the first external device or a second external device after the second information is transmitted, and causing information included in the third information to be transmitted to the specified information processing apparatus by the maintained session.

According to an embodiment of the present disclosure, there is provided an information processing system including an information processing apparatus, and a relay device configured to be communicable with the information processing apparatus. The relay device includes a communication control unit configured to control communication with an external device. The communication control unit maintains a session with an information processing apparatus that transmits first information when the first information including specific information that is able to specify a calling party in a voice call is acquired by communication, causes second information including the specific information included in the first information to be transmitted to a first external device, specifies the information processing apparatus having transmitted the first information on the basis of the specific information included in acquired third information when the third information including the specific information and information for transmission is acquired from the first external device or a second external device after the second information is transmitted, and causes information included in the third information to be transmitted to the specified information processing apparatus by the maintained session.

According to the present disclosure, it is possible to achieve the improvement of user's convenience.

Note that the effects described above are not necessarily limited, and along with or instead of the effects, any effect that is desired to be introduced in the present specification or other effects that can be expected from the present specification may be exhibited.

DETAILED DESCRIPTION OF THE EMBODIMENTS

Figure 1:
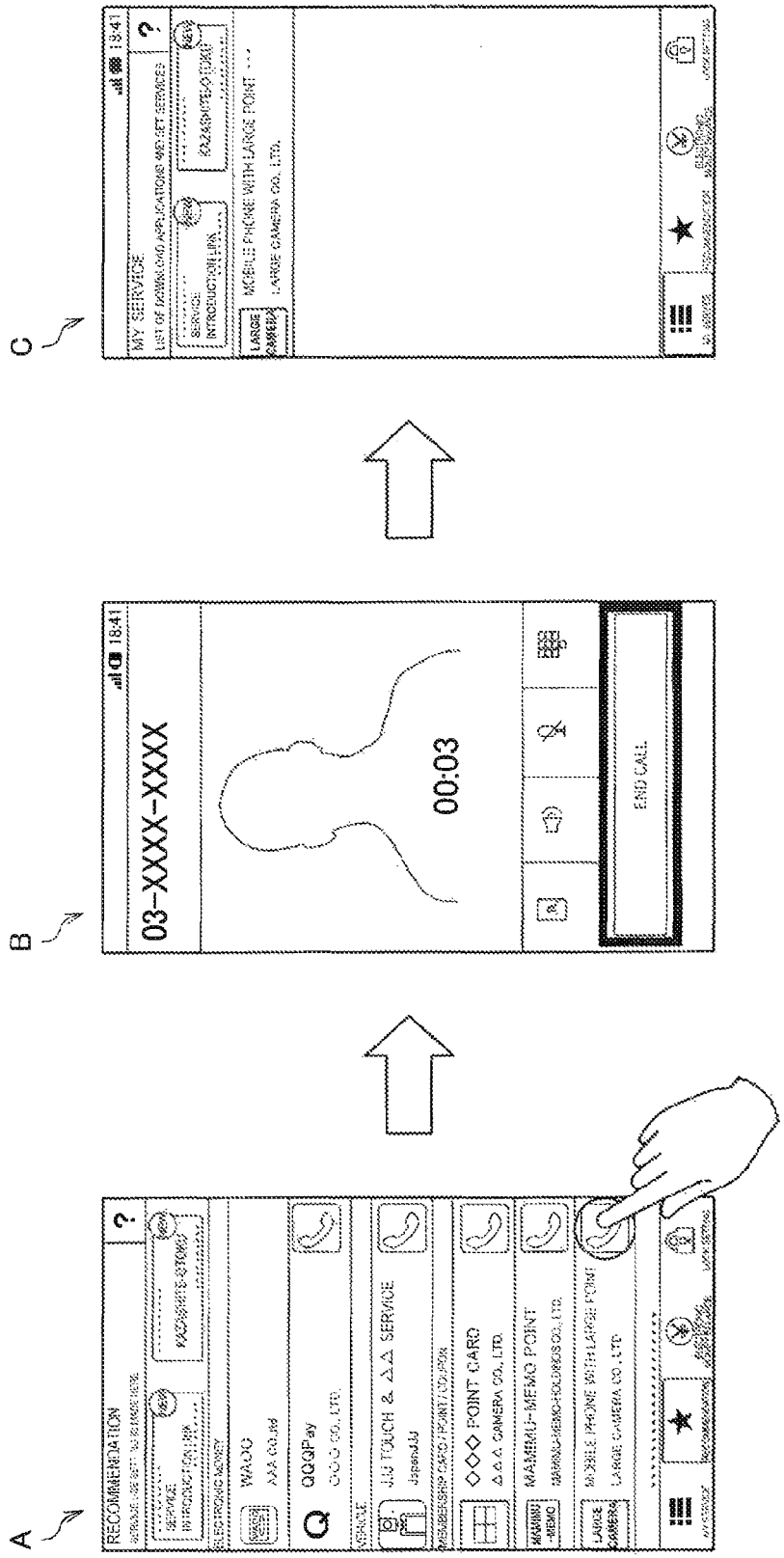
FIG. 1 is an explanatory diagram illustrating one example of a use case realized by an information processing system according to the present embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Moreover, an explanation is given below in the following order.

1. Information processing system according to the present embodiment
2. Program according to the present embodiment (Information Processing System According to the Present Embodiment)

Use Case

Before the configuration of an information processing system according to the present embodiment is described, a use case realized by using the information processing system according to the present embodiment is described.

FIG. 1 is an explanatory diagram illustrating one example of the use case realized by using the information processing system according to the present embodiment. FIG. 1 illustrates one example of the use case where an information processing apparatus is caused to accommodate a new service by causing the information processing apparatus to acquire information (data) on the new service. FIG. 1 illustrates an example where the information processing apparatus is a smart phone having a touch panel.

The user of the information processing apparatus touches "telephone icon" corresponding to a service to be newly added, in a service management application like a viewer application that displays a list of services using a secure memory area (for example, an embedded secure element, an MC (Universal Integrated Circuit Card), an SD card or a general-purpose memory securely managed by application processor) in the information processing apparatus (A of FIG. 1). In A of FIG. 1, a service that is already used by the user is displayed by selecting the "my service" menu in the lower part of the screen, and a list of services that can be used by the user is displayed by selecting the "recommendation" menu in the lower part of the screen. Here, an example is illustrated where "telephone icon" corresponding to the service to be newly added by the user is touched in the list of services displayed in the "recommendation" menu. Here, for example, the touch according to the present embodiment is to press the touch panel by a finger, and so on, or make a finger, and so on, close to the touch panel. An executive instruction of processing related to "telephone icon" may be input by operation by another input device such as a button and a pen besides the touch panel. Moreover, when "telephone icon" is not displayed and the service to be newly added by the user is selected, a submenu to call a service provider may be displayed.

A telephone application to make a voice call is activated on the basis of the touch of "telephone icon", and the voice call is started between the user and an operator supporting the service to be newly added (B of FIG. 1). The user tells information requested to add the service (for example, private information, and so on) by voice, and the operator performs operation to add the service.

Information on the new service is acquired in the information processing apparatus on the basis of the above-mentioned operator's operation originating in the voice call, and, as a result, the new service is added in the information processing apparatus (C of FIG. 1). For example, the user can confirm that the new service is added, by selecting the "my service" menu in the lower part of the screen.

For example, in a case where the information on the new service is acquired in the information processing apparatus on the basis of the voice call between the user and the operator like the use case illustrated in FIG. 1, the user may not perform operation according to a UI like an input of private information, and so on. Therefore, even if the user is low literate, the user can cause the information processing apparatus to accommodate the new service more easily.

Therefore, it is possible to achieve the improvement of user's convenience by realizing the use case as illustrated in FIG. 1, for example. Here, a service that uses a secure memory area in the information processing apparatus is described in the use case illustrated in FIG. 1, but the use case according to the present embodiment is not limited to the above. For example, the use case according to the present embodiment is also applicable to a service that does not use the secure memory area, like a case where an application is merely downloaded and installed or a case where the setting of an application to be installed is requested to be installed in the user's information processing apparatus after the application is uniquely customized by a service provider according to its own service.

In the following, for example, an explanation is given to an information processing system according to the present embodiment that can realize the use case as illustrated in FIG. 1.

Figure 2:
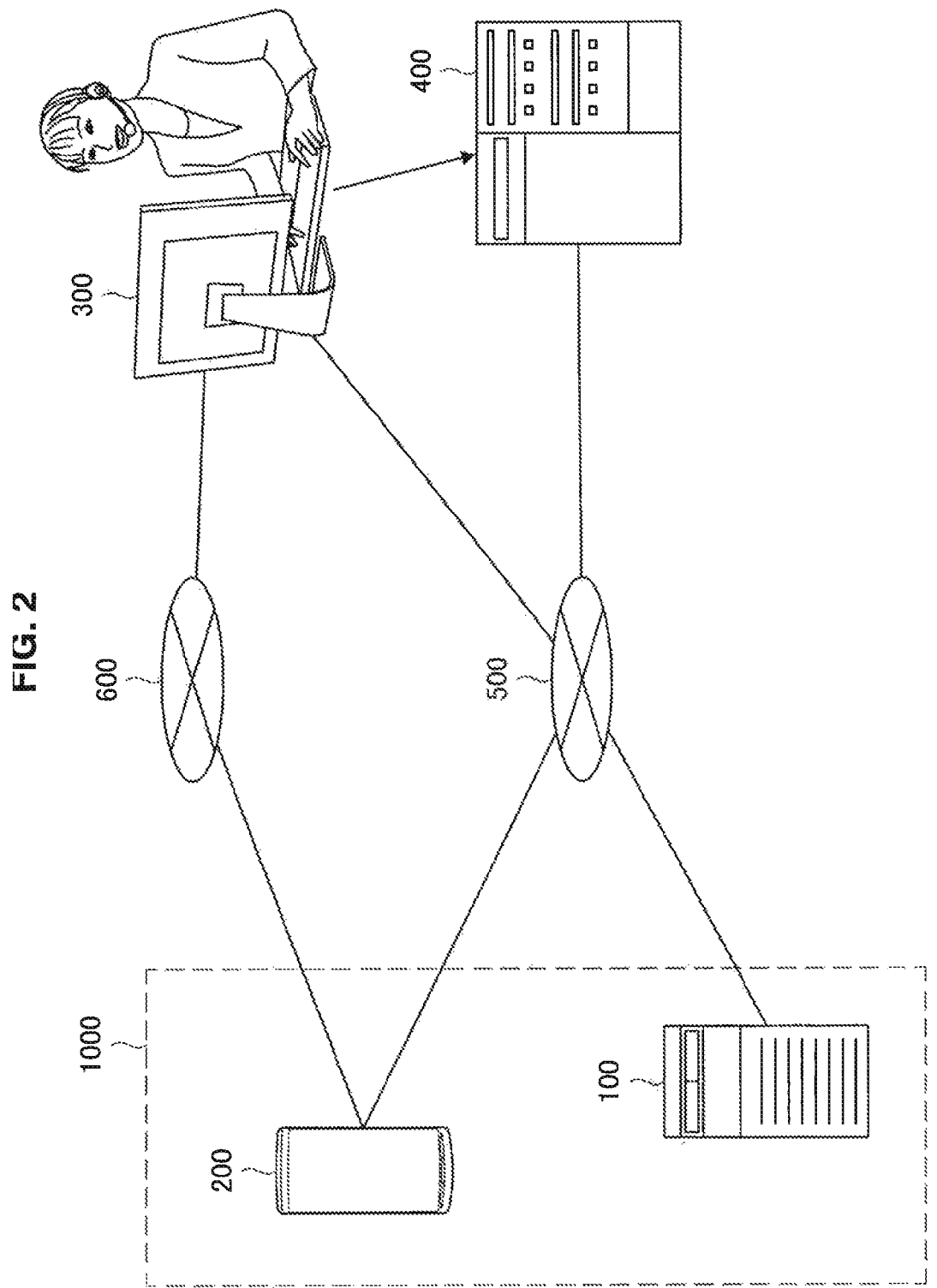
FIG. 2 is an explanatory diagram illustrating one example of an information processing system according to the present embodiment.

One example of information processing system according to the present embodiment FIG. 2 is an explanatory diagram illustrating one example of an information processing system 1000 according to the present embodiment. For example, the information processing system 1000 has a relay device 100 and an information processing apparatus 200.

Moreover, in FIG. 2, an operator device 300 (which is one example of the first external device) that is a device used by an operator and a service provider server 400 (which is one example of the second external device) that is a device prepared by a service provider to provide a service are illustrated together. Here, for example, the operator device 300 and the service provider server 400 have a configuration similar to the hardware configuration of the relay device 100 described later.

The relay device 100, the information processing apparatus 200, the operator device 300 and the service provider server 400 can perform communication through a network 500 (or directly).

Here, as the network 500, for example, there are the Internet using a communication protocol such as an TCP/IP (Transmission Control Protocol/internet Protocol), and a wireless network such as a wireless WAN (WWAN: Wireless Wide Area Network) through a base station, and a wired network such as a WAN (Wide Area Network), and so on. Moreover, the operator device 300 and the service provider server 400 may perform communication through a local network formed with a LAN (Local Area Network) and a wireless LAN, and so on.

Moreover, for example, a user of the information processing apparatus 200 and an operator using the operator device 300 can make a voice call by a voice communication network 600 formed with a base station, and so on. Here, for example, in a case where the voice call is realized as data communication like a case where VoLTE (Voice over Long Term Evolution) is used, the voice communication network 600 may be the network 500. That is, the voice communication network 600 and the network 500 may be different or may be identical.

Here, the configuration of the information processing system according to the present embodiment is not limited to the configuration illustrated in FIG. 2.

For example, the information processing system according to the present embodiment may have multiple information processing apparatuses 200. Even in a case where multiple information processing apparatuses 200 are included, the relay device 100 can perform processing related to a relay method according to the present embodiment described later, on each of multiple information processing apparatuses 200.

Moreover, for example, the information processing system according to the present embodiment may include one or two or more operator devices 300 (which are one example of the first external device) and one or two or more service provider servers 400 (which are one example of the second external device).

In the following, a case where the information processing system according to the present embodiment is the information processing system 1000 illustrated in FIG. 2 is exemplified.

[2-1] Relay Device 100

For example, the relay device 100 plays a role to relay various kinds of information (data) between the information processing apparatus 200 and an external device such as the operator device 300 and the service provider server 400.

For example, by performing (1) communication control processing as processing related to the relay method according to the present embodiment, the relay device 100 transmits information (data) to the information processing apparatus 200 specified as a transmission target.

(1) Communication Control Processing

The relay device 100 controls communication with an external device. To be more specific, for example, the relay device 100 performs (1-1) communication management processing and (1-2) transmission control processing as communication control processing. Here, (1-1) communication management processing and (1-2) transmission control processing shown below are provided by dividing the communication control processing according to the present embodiment into two items of processing for convenience' sake. Therefore, the communication control processing according to the present embodiment can be understood as one processing combining (1-1) communication management processing and (1-2) transmission control processing shown below or can be grasped as three or more items of processing which are further divided. In the following, the communication control processing according to the present embodiment is described as (1-1) communication management processing and (1-2) transmission control processing separately.

(1-1) Communication Management Processing

In a case where the first information is acquired from the information processing apparatus 200 by communication, the relay device 100 maintains a session with the information processing apparatus 200 having transmitted the first information.

For example, the relay device 100 performs communication management processing by controlling communication in a communication unit (described later) included in the relay device 100 or a connected external communication device. In the following, a case where the relay device 100 controls the communication unit (described later) included in the relay device 100 in the communication management processing is exemplified.

To be more specific, for example, the relay device 100 transmits a temporary ID (hereinafter referred to as "session ID") which is less likely to overlap, to the information processing apparatus 200 having transmitted the first information. When the information processing apparatus 200 periodically transmits a communication request including the session ID to the relay device 100 and the relay device 100 responds to the communication request, a session with the information processing apparatuses 200 having transmitted the first information is maintained. Moreover, by including a processing instruction at the time of performing the above-mentioned response, the relay device 100 can cause the information processing apparatus 200 to perform processing according to the processing instruction.

In a case where the communication request including the session ID is not received during a set predetermined time, the relay device 100 determines that communication with the information processing apparatus 200 is interrupted, and discards the session. Moreover, in a case where a response to the communication request is not received during the set predetermined time, the information processing apparatus 200 can determine that communication with the relay device 100 is interrupted, and discard the session. Here, for example, by holding the session ID in association with the first information acquired from the information processing apparatus 200 without discarding the session ID even if the session is discarded, the relay device 100 can determine that there occurs a phenomenon in which communication is interrupted though connection from the identical information processing apparatus 200 to the relay device 100 is tried multiple times. Moreover, the relay device 100 may additionally discard the session ID and/or the first information when the session is discarded.

Here, the session maintenance method according to the present embodiment is not limited to the above. For example, the relay device 100 can use an arbitrary method that can maintain a session.

Here, the first information according to the present embodiment is data transmitted from the information processing apparatus 200. The first information includes specific information (data) that can specify the calling party in a voice call.

Here, as the specific information according to the present embodiment, for example, there is data showing the telephone number. Here, the specific information according to the present embodiment is not limited to the data showing the telephone number, and, for example, it may be arbitrary information (data) that can specify the calling party in a case where users mutually make a voice call in a call application that does not use the telephone number. In the following, a case where the specific information according to the present embodiment is data showing the telephone number is exemplified.

Here, data included in the first information according to the present embodiment is not limited to specific information such as the data showing the telephone number. For example, the first information according to the present embodiment may further include service identification information, information on the storage state of data in the information processing apparatus (hereinafter referred to as "information on the storage state") or identification information that specifies the information processing apparatus 200, and so on.

As the service identification information according to the present embodiment, for example, there is information (data) showing service, such as the ID that can uniquely determine the service and the ID that can uniquely determine a service provider.

Moreover, as the information on the storage state according to the present embodiment, for example, there is information (data) shown below. Here, as a recording medium included in the information processing apparatus, for example, there are memory in the information processing apparatus and a nonvolatile memory in an IC chip included in the information processing apparatus, and so on.

Information showing a storage area of the recording medium included in the information processing apparatus: information on an area in which various kinds of information related to service are stored (list data of area codes showing areas assigned for respective services in a secure memory area)

Information showing an application installed in the information processing apparatus: list data of applications installed in the information processing apparatus or list data of package names that enable the applications installed in the information processing apparatus to be uniquely determined Moreover, the relay device 100 may be caused to transmit a voice call start request for starting a voice call with an operator, to the information processing apparatus 200 having transmitted the first information.

For example, the voice call start request according to the present embodiment includes an activation order that activates a telephone application to make a voice call. Moreover, the voice call start request according to the present embodiment may include data showing the telephone number of the operator device 300 (or a call center including the operator device 300).

In a case where the telephone number is updated, for example, by performing the update of the service management application, information on the telephone number held in the information processing apparatus 200 can be kept the latest number. However, in a case where the user does not perform the update of the service management application, it may happen that the telephone number shown by the data showing the telephone number held in the information processing apparatus 200 is not the latest number. Here, when the relay device 100 holds the telephone number of the operator device 300 and the telephone number is updated, the updated telephone number may be held. By doing so, when the relay device 100 acquires the data showing the telephone number of the operator device 300 held in the information processing apparatus 200, the relay device 100 can determine whether the telephone number of the operator device 300 recognized by the user of the information processing apparatus 200 is the latest updated number. In a case where it is determined that information on the telephone number held in the information processing apparatus 200 is not the latest one, for example, the relay device 100 transmits information showing that the telephone number is updated, to the information processing apparatus 200. Here, even if the telephone number of the operator device 300 held in the information processing apparatus 200 is not acquired from the information processing apparatus 200, by acquiring version information on the service management application, the relay device 100 can determine that there is information that is not updated in the information processing apparatus 200.

By causing the relay device 100 to transmit a voice call start request to the information processing apparatus 200 having transmitted the first information, it becomes possible to start a voice call between the user and the operator in a state where processing related to the relay method according to the present embodiment is performed.

(1-2) Transmission Control Processing

The relay device 100 is caused to transmit second information to the first external device.

For example, the relay device 100 performs transmission control processing by controlling communication in the communication unit (described later) included in the relay device 100 or in a connected external communication device. In the following, a case where the relay device 100 controls the communication unit (described later) included in the relay device 100 in the transmission control processing is exemplified.

Here, as the first external device according to the present embodiment, for example, there are devices shown below. In FIG. 2, the operator device 300 corresponds to one example of the first external device.

Device that provides service corresponding to service identification information (in a case where the service identification information is included in the first information)

Device having transmitted an information transmission request for requesting the transmission of information after the first information is acquired Device used by an operator who makes a voice call to the user of an information processing apparatus having transmitted the first information (operator device)

Device that can transmit the second information to the device (operator device) used by the operator (for example, a server that manages a call center, and so on)

Moreover, the second information according to the present embodiment is data in which the relay device 100 transmits to the first external device. The second information includes data showing the telephone number included in the first information.

Here, data included in the second information according to the present embodiment is not limited to the data showing the telephone number included in the first information. For example, in a case where the relay device 100 further performs state determination processing described later as processing related to the relay method according to the present embodiment, the second information according to the present embodiment may further include information showing the result of the state determination processing ("information showing a service-related state" described later).

Moreover, in a case where the third information is acquired after the second information is transmitted, the relay device 100 specifies the information processing apparatus 200 having transmitted the first information on the basis of the acquired third information.

Here, the third information according to the present embodiment is data acquired from the first external device or the second external device. For example, the third information according to the present embodiment corresponds to data transmitted on the basis of operation of the operator in the use case illustrated in FIG. 1.

Moreover, for example, the second external device according to the present embodiment is a device set to the relay device 100. In FIG. 2, the operator device 300 corresponds to one example of the second external device.

The third information includes data showing the telephone number and information (data) for transmission.

As the information for transmission according to the present embodiment, for example, there is a processing request for causing predetermined processing to be performed.

For example, the processing request according to the present embodiment includes a processing instruction to cause various kinds of processing to be performed. Moreover, for example, the processing request according to the present embodiment may include other data such as a command data acquisition destination URL (Uniform Resource Locator) and data related to each processing (data related to the addition of service and data written in a memory in the information processing apparatus 200).

When a specific example is given, for example, there are the following examples as the processing request according to the present embodiment. For example, the memory in the information processing apparatus is an IC (Integrated Circuit) chip included in the information processing apparatus or a detachable recording medium, and it may be a secure memory area or a non-secure memory area. Generally, a service provider is likely to request a complicated procedure for service start in service using the secure memory area.

Issue request according to addition of service: request for service start

The issue request accommodates processing that initializes the memory area in the information processing apparatus and/or secures (issues) an area corresponding to the service in the memory area.

Deletion request related to deletion of service: request for service end

The deletion request accommodates processing that deletes an area corresponding to the service from the memory in the information processing apparatus.

Readout request according to reading of data: For example, the readout request accommodates processing that reads out data of an area corresponding to service from the memory in the information processing apparatus for support when the service does not operate well or when an application is requested to be installed in the user's information processing apparatus in a state where the service provider originally customizes the application according to its own service.

Writing request according to writing of data: For example, the writing request accommodates processing that writes arbitrary data in an area corresponding to a service of the memory in the information processing apparatus for "support that resolves a state where service does not operate well" and "subtraction, addition and giving of an electronic value by establishment of transaction by telephone, and so on".

Request according to assistance of application introduction: For example, the request according to the assistance of application introduction accommodates induction processing for application download such as the activation of a market application that specifies an arbitrary application or a Web page and the activation of a Web browser. Moreover, for example, the request according to the assistance of application introduction may accommodate induction processing of a complicated step such as the initial setting requested by the service provider.

Here, for example, the processing request according to the present embodiment may combine two or more of the above-mentioned requests. As an example of combining the above-mentioned requests, for example, there are the following examples.

Readout request+deletion request: For example, in a case where the information processing apparatus 200 is a smart phone or the like, a combination of the readout request and the deletion request accommodates processing in a case where data stored in the memory in the information processing apparatus is transferred to another information processing apparatus of transfer destination according to a model change.

Issue request+writing request: For example, at the model change in a case where the information processing apparatus 200 is a smart phone or the like, a combination of the issue request and the writing request accommodates processing that initializes an area in the memory included in another information processing apparatus of transfer destination, ensures the area and writes transfer data in the area in another information processing apparatus of transfer destination.

Here, the information for transmission according to the present embodiment is not limited to the processing request. For example, the information for transmission according to the present embodiment may be arbitrary data that can be transmitted to the information processing apparatus 200.

To be more specific, in a case where the third information is acquired, for example, the relay device 100 specifies the information processing apparatus 200 having transmitted the first information, on the basis of the telephone number included in the third information. The relay device 100 specifies the information processing apparatus 200 by comparing the telephone number included in the acquired first information and the telephone number included in the third information and specifying the information processing apparatus 200 having transmitted the first information including the telephone number that agrees with the telephone number included in the third information.

For example, when the information processing apparatus 200 is specified as mentioned above, the relay device 100 transmits information included in the third information to the specified information processing apparatus 200 by a session maintained by above-mentioned processing (1-1) (communication management processing).

For example, by performing the above-mentioned processing (1) (communication control processing) (for example, above-mentioned processing (1-1) (communication management processing) and above-mentioned processing (1-2) (transmission control processing)) as the processing related to the relay method according to the present embodiment, for example, the relay device 100 can transmit information (data) to the information processing apparatus 200 specified as a transmission target.

Here, the information in which the relay device 100 transmits to the information processing apparatus 200 specified as the transmission target is, for example, data transmitted on the basis of operator's operation in the use case illustrated in FIG. 1. Therefore, for example, when the relay device 100 performs above-mentioned processing (1) (communication control processing) (for example, above-mentioned processing (1-1) (communication management processing) and above-mentioned processing (1-2) (transmission control processing)) as the processing related to the relay method according to the present embodiment, for example, it is possible to realize the use case as illustrated in FIG. 1.

Therefore, for example, when the relay device 100 performs above-mentioned processing (1) (communication control processing) (for example, above-mentioned processing (1-1) (communication management processing) and above-mentioned processing (1-2) (transmission control processing)) as the processing related to the relay method according to the present embodiment, an information processing system that can achieve the improvement of user's convenience is realized.

Here, the processing related to the relay method according to the present embodiment is not limited to above-mentioned processing (1) (communication control processing).

For example, the relay device 100 can also transmit information to the information processing apparatus 200 specified on the basis of the telephone number included in the acquired third information without performing above-mentioned processing (1-1) (communication management processing). In a case where the relay device 100 does not maintain a session with the information processing apparatus 200 having transmitted the first information, the relay device 100 transmits information to the specified information processing apparatus 200 by the use of, for example, SMS (Short Message Service) in above-mentioned processing (1-2) (transmission control processing).

To be more specific, for example, when the first information is acquired from the information processing apparatus 200 by communication, the relay device 100 transmits the session ID to the information processing apparatus 200 having transmitted the first information. Moreover, in a case where information is transmitted to the information processing apparatus 200 specified on the basis of the telephone number included in the acquired third information, the relay device 100 transmits the session ID corresponding to the specified information processing apparatus 200 and information on the transmission target to the information processing apparatus 200 by the use of the SMS.

In the information processing apparatus 200 that receives the SMS, for example, information included in the SMS is passed to an application through an OS (Operating System), and the information is processed by the application. Moreover, in a case where the SMS including the session ID is not received during a set predetermined time, the information processing apparatus 200 deletes the session ID received from the relay device 100.

For example, in a case where the SMS is used as mentioned above, the relay device 100 can transmit information to the information processing apparatus 200 specified on the basis of the telephone number included in the acquired third information without performing above-mentioned processing (1-1) (communication management processing).

Moreover, for example, in a case where service identification information and information on the storage state are included in the first information acquired from the information processing apparatus 200, it is also possible that the relay device 100 further performs the following state determination processing as the processing related to the relay method according to the present embodiment.

(2) State Determination Processing

In a case where the first information is acquired, the relay device 100 determines a service-related state in the information processing apparatus 200 having transmitted the first information, on the basis of the service identification information and the information on the storage state.

To be more specific, for example, the relay device 100 specifies a storage area that can be accessed by a service provider corresponding to the service identification information and an application corresponding to the service, on the basis of the service identification information included in the first information. Here, for example, depending on the service corresponding to the service identification information, the relay device 100 may specify one of the storage area that can be accessed by the service provider and the application corresponding to the service.

For example, with the service identification information as a search key, by searching a database with which the service identification information, the storage area and the application are associated, the relay device 100 specifies the storage area that can be accessed by the service provider corresponding to the service identification information and the application corresponding to the service.

Moreover, in a case where the database with which the service identification information, the storage area and the application are associated is stored in an external device such as a server, for example, the relay device 100 may transmit a search request including service identification information and search instruction to the external device. In a case where the search request is transmitted to the external device, the relay device 100 specifies the storage area and application shown by a search result acquired from the external device, as a storage area that can be accessed by the service provider corresponding to the service identification information and an application corresponding to the service.

When the storage area which corresponds to the service and can be accessed by the service provider and the application corresponding to the service are specified, the relay device 100 determines a state related to the service.

For example, the relay device 100 collates the specified storage area corresponding to the service with a storage area shown by information showing the storage area, and collates the specified application corresponding to the service with an application shown by information showing the application. Further, for example, the relay device 100 determines the service-related state by determining whether the specified storage area corresponding to the service includes the storage area shown by the information showing the storage area and whether the specified application corresponding to the service includes the application shown by the information showing the application.

Here, the determination as to whether the specified storage area corresponding to the service includes the storage area shown by the information showing the storage area corresponds to determination as to whether an area corresponding to the service exists in a recording medium included in the information processing apparatus 200. Moreover, the determination as to whether the specified application corresponding to the service includes the application shown by the information showing the application corresponds to determination as to whether an application corresponding to service is installed in the information processing apparatus 200.

For example, in a case where the specified storage area corresponding to the service does not include the storage area shown by the information showing the storage area or in a case where the specified application corresponding to the service does not include the application corresponding to the information showing the application, it corresponds to "a state where the information processing apparatus 200 is not able to normally perform processing related to the service shown by the service identification information" or "a state where, although the processing related to the service can be normally performed in the store or the like, since there is no application, the user is not able to cause the information processing apparatus 200 to perform desired processing realized by the application (for example, confirmation of the value of an electronic value (which corresponds to balance confirmation) and the charge of the electronic value). That is, for example, in the relay device 100, to determine whether the specified storage area corresponding to the service includes the storage area shown by the information showing the storage area and whether the specified application corresponding to the service includes the application corresponding to the information showing the application, is equivalent to determine the service-related state in the relay device 100.

As state determination processing, for example, by performing processing as mentioned above, the relay device 100 determines the service-related state in the information processing apparatus 200 having transmitted the first information.

Moreover, in a state where the service-related state is determined by the state determination processing, the relay device 100 causes the second information including information showing the service-related state to be transmitted to the first external device in above-mentioned processing (1-2) (transmission control processing). Here, as the information showing the service-related state according to the present embodiment, for example, there are data showing whether there is an area corresponding to the service in the recording medium included in the information processing apparatus 200, and data showing whether an application corresponding to the service is installed in the information processing apparatus 200.

When the relay device 100 performs the state determination processing, the user of the first external device becomes possible to understand the state related to a service of the information processing apparatus 200 corresponding to the telephone number included in the second information by content corresponding to information showing the service-related state.

Therefore, when the relay device 100 performs the state determination processing, for example, an operator who is the user of the operator device 300 (which is one example of the first external device) can understand the service-related state in the information processing apparatus 200 without finding out the state of the information processing apparatus 200 by oral from the user of the information processing apparatus 200 that makes a voice call. Here, for example, the operator specifies the telephone number corresponding to the information processing apparatus 200 that makes the voice call, by "caller ID display" (or referred to as "number display").

Therefore, when the relay device 100 performs the state determination processing, for example, it is possible to save the trouble of both of the user of the information processing apparatus 200 and the operator of the operator device 300 (which is one example of the first external device) and improve the convenience.

[2-2] Information Processing Apparatus 200

For example, the information processing apparatus 200 is a device having a communication function (or communication control function) to communicate with an external device such as the relay device 100, and a voice call function (or voice call control function). Here, the communication function and the voice call function may be realized by an external device connected with the information processing apparatus 200.

Moreover, for example, the information processing apparatus 200 includes a recording medium that can store information on services and data of applications, and so on.

As the recording medium included in the information processing apparatus 200, for example, there are a magnetic recording medium such as a hard disk, and a nonvolatile memory such as a flash memory, and so on. Moreover, the recording medium included in the information processing apparatus 200 may be detachable from the information processing apparatus 200.

Here, the recording medium included in the information processing apparatus 200 is not limited to the above. For example, the recording medium included in the information processing apparatus 200 may be a memory forming an IC related to a communication function by NFC (Near Field Communication). Moreover, for example, the recording medium included in the information processing apparatus 200 may have tamper resistance.

One example of processing in information processing system according to the present embodiment Next, one example of the processing in the information processing system according to the present embodiment is described while exemplifying processing in a system including the information processing system 1000 illustrated in FIG. 2.

In the following, an explanation is given to one example of the processing in the information processing system according to the present embodiment that can realize the use case illustrated in FIG. 1 when the relay device 100 transmits an issue request according to the addition of service to the information processing apparatus 200 as information included in the acquired third information. Here, as mentioned above, it is needless to say that information which is included in the acquired third information and in which the relay device 100 transmits to the information processing apparatus 200 is not limited to the issue request.

Figure 3:
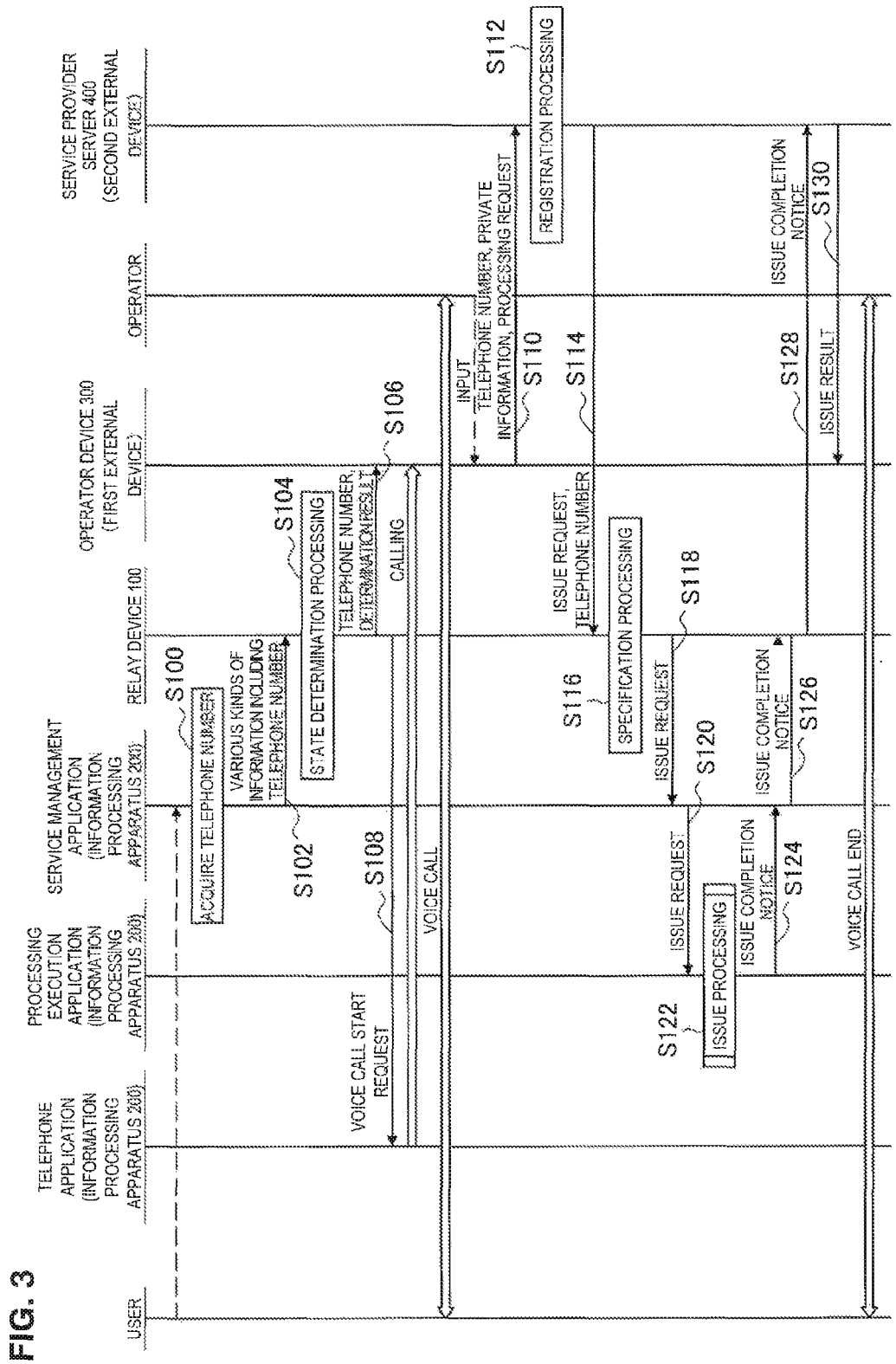
FIG. 3 is an explanatory diagram to describe the first example of processing in an information processing system according to the present embodiment.

[3-1] First Example of Processing in Information Processing System According to the Present Embodiment FIG. 3 is an explanatory diagram to describe the first example of the processing in the information processing system according to the present embodiment. Here, processing in step S104 of FIG. 3 corresponds to above-mentioned processing (2) (state determination processing). Processing in steps S116 and S118 of FIG. 3 corresponds to above-mentioned processing (1-2) (transmission control processing).

For example, when the user touches "telephone icon" as illustrated in A of FIG. 1, a service management application in the information processing apparatus 200 acquires the telephone number of the information processing apparatus 200 (S100).

For example, the service management application acquires the telephone number by reading out the telephone number from a memory in which the telephone number is stored. Moreover, for example, the service management application may acquire the telephone number by the use of an arbitrary method that can acquire the telephone number by acquiring the ID that can specify the telephone number from a SIM (Subscriber Identity Module) and acquiring the telephone number on the basis of the ID. Moreover, for example, in a case where a call by the voice communication network 600 is a call by an IP phone, the service management application can also recognize an activated IP phone application and acquire the telephone number.

The service management application in the information processing apparatus 200 transmits the first information including the telephone number acquired in step S100 to the relay device 100 (S102). For example, the service management application in the information processing apparatus 200 transmits the first information to the relay device 100 with reference to information on the IP address, and so on, set beforehand to transmit the information to the relay device 100.

The relay device 100 having received the first information transmitted from the information processing apparatus 200 in step S102 performs state determination processing on the basis of the received first information (S104).

Moreover, by performing above-mentioned processing (1-1) (communication management processing), the relay device 100 having received the first information maintains a session with the information processing apparatus 200 having transmitted the first information in step S102 though it is not illustrated in FIG. 3.

When performing the state determination processing in step S104, the relay device 100 transmits the second information including the telephone number and information showing the service-related state showing a determination result, to the operator device 300 (S106). For example, the relay device 100 transmits the second information to the operator device 300 by the use of SMS, email, IRC (Internet Relay Chat) or an arbitrary messaging method that can be realized on a network.

The relay device 100 transmits a voice call start request to the information processing apparatus 200 having transmitted the first information in step S102 (S108).

Here, FIG. 3 illustrates an example where the relay device 100 performs the processing in step S108 after the processing in steps S104 and S106, but processing in the relay device 100 is not limited to the above-mentioned example. For example, the relay device 100 can perform the processing in step S108 before the processing in steps S104 and S106, and also perform the processing in step S108 in parallel with the processing in steps S104 and S106.

The information processing apparatus 200 having received the voice call start request transmitted from the relay device 100 in step S108 sends a voice call through the voice communication network 600 by a telephone application. FIG. 3 illustrates an example where the telephone application in the information processing apparatus 200 makes a call to the operator device 300.

By the above-mentioned calling, the voice call between the user of the information processing apparatus 200 and the operator of the operator device 300 is started. Moreover, for example, the operator can understand the service-related state in the information processing apparatus 200 of the user who is making the voice call, on the basis of the first information transmitted from the relay device 100 in step S106.

For example, when the operator who is making the voice call with the user performs operation such as an input based on the content of the voice call on the operator device 300, for example, the operator device 300 transmits the telephone number included in the first information received in step S102, user's private information and a processing request including the content of processing and a processing instruction, to the service provider server 400 (S110). In FIG. 3, it is assumed that the processing request for performing issue processing is transmitted from the operator device 300 to the service provider server 400.

For example, the service provider server 400 having received various kinds of information transmitted from the operator device 300 in step S110 performs registration processing to newly register or update data in a database, and so on, on the basis of the received private information (S112).

Moreover, the service provider server 400 transmits third information including the telephone number received in step S110 and an issue request based on the processing request received in S110, to the relay device 100 (S114). Here, as the issue request according to the present embodiment, for example, there is a processing instruction that activates web plug-in (which is one example of a processing execution application) for issue. Moreover, the issue request according to the present embodiment may include other data such as a command data acquisition destination URL.

The relay device 100 having received the third information transmitted from the service provider server 400 in step S114 specifies the information processing apparatus 200 of a target to which the issue request is transmitted, on the basis of the telephone number included in the third information (S116). The relay device 100 specifies the information processing apparatus 200 having transmitted the first information including a telephone number that agrees with the telephone number included in the third information, as the information processing apparatus 200 of the target to which the issue request is transmitted.

The relay device 100 transmits the issue request to the information processing apparatus 200 specified in step S116 (S118).

Here, the relay device 100 transmits information on the issue request or the like included in the third information transmitted from the service provider server 400 in step S114, as it is in step S118. Here, processing in the relay device 100 in step S118 is not limited to the above. For example, the relay device 100 may process information included in the third information transmitted from the service provider server 400 in step S114 into a format corresponding to a communication interface related to the maintained session, and transmit the processed information to the information processing apparatus 200 in step S118.

In the information processing apparatus 200 having received the issue request transmitted from the relay device 100 in step S118, the service management application transmits the issue request to the processing execution application (S120). Further, in the information processing apparatus 200, the processing execution application performs issue processing based on the issue request (S122).

Figure 4:
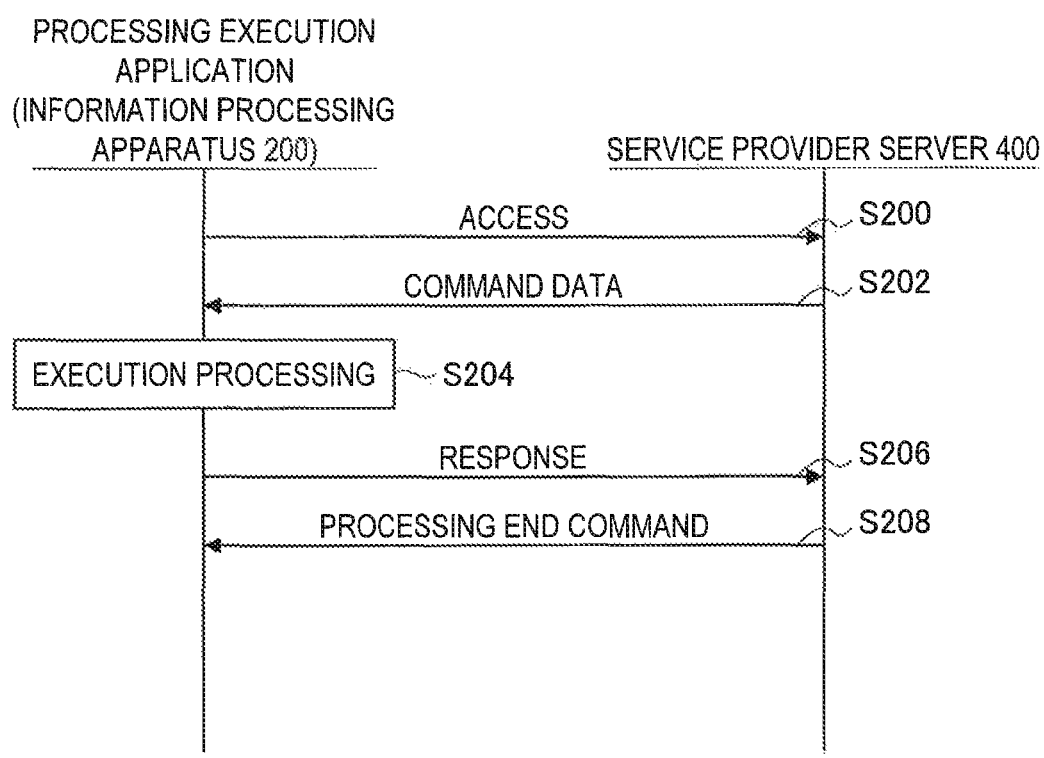
FIG. 4 is an explanatory diagram illustrating one example of processing based on a processing request performed in an information processing apparatus according to the present embodiment.

FIG. 4 is an explanatory diagram illustrating one example of processing based on the processing request performed in the information processing apparatus 200 according to the present embodiment, and illustrates one example of the issue processing performed according to the issue request performed in step S122 of FIG. 3. FIG. 4 illustrates an example where the processing execution application of the information processing apparatus 200 performs the issue processing by communication with the service provider server 400.

For example, the processing execution application of the information processing apparatus 200 accesses the service provider server 400 by a web plug-in activated on the basis of the issue request (S200). The service provider server 400 having received the access from the information processing apparatus 200 in step S200 transmits command data including the processing instruction to the information processing apparatus 200 (S202).

In the information processing apparatus 200 having received the command data transmitted from the service provider server 400 in step S202, the processing execution application performs processing on the basis of the command data (S204). For example, in a case where the command data is data related to the issue processing, the processing execution application performs operation (for example, area securement and data writing, and so on) with respect to a recording medium such as a memory forming an IC related to a communication function by NFC, according to the command data.

For example, the processing execution application of the information processing apparatus 200 transmits a response including the result of processing in step S204 to the service provider server 400 (S206). The service provider server 400 having received the response transmitted from the information processing apparatus 200 in step S206 transmits a processing end command (S208), and processing by the processing execution application of the information processing apparatus 200 ends on the basis of the end command.

In step S122 of FIG. 3, for example, the processing illustrated in FIG. 4 is performed. Here, the processing in step S122 of FIG. 3 is not limited to the processing illustrated in FIG. 4. For example, in a case where the response in step S206 of FIG. 4 shows that the processing in step S204 is not normally performed, the service provider server 400 may perform the processing in step S202 again without performing the processing in step S208.

Referring to FIG. 3 again, the first example of the processing in the information processing system according to the present embodiment is described. When the processing in step S122 is performed, the processing execution application of the information processing apparatus 200 transmits an issue completion notice showing that the processing in step S122 is normally performed, to the service management application (S124). Further, the service management application of the information processing apparatus 200 transmits the issue completion notice transmitted in step S124 to the relay device 100 (S126).

The relay device 100 having received the issue completion notice transmitted from the information processing apparatus 200 in step S126 transmits the issue completion notice to the service provider server 400 (S128). Moreover, for example, in the case of having received the issue completion notice transmitted from the information processing apparatus 200, the relay device 100 discards the session with the information processing apparatus 200 having transmitted the issue completion notice.

Here, even after the issue processing is completed, there may be a case where the relay device 100 receives a new processing request depending on call content between the user and the operator. Therefore, for example, the relay device 100 may not discard the session with the information processing apparatus 200 when receiving the issue completion notice transmitted from the information processing apparatus 200, and may discard the session with the information processing apparatus 200 in the case of receiving information (data) which shows the end of a voice call and which is transmitted from the information processing apparatus 200 after the voice call between the user and the operator ends.

The service provider server 400 having received the issue completion notice transmitted from the relay device 100 in step S128 transmits data showing the issue result to the operator device 300 (S130).

When the data showing the issue result is received in the operator device 300 in step S130, the operator can understand that an issue with respect to the information processing apparatus 200 corresponding to the user who is making a voice call is normally completed. Therefore, afterward, for example, the voice call between the operator and the user is ended when the issue is normally completed.

For example, by performing processing in the information processing system according to the first example illustrated in FIG. 3, service is issued through the voice call between the user and the operator. Therefore, for example, by performing the processing in the information processing system according to the first example illustrated in FIG. 3, the use case illustrated in FIG. 1 is realized.

Here, the processing in the information processing system according to the first example is not limited to the processing illustrated in FIG. 3.

For example, the relay device 100 may transmit the second information that does not include information showing the service-related state to the operator device 300 in step S106 without performing the processing in step S104.

Even in the case of transmitting the second information that does not include the information showing the service-related state to the operator device 300 without performing the processing in step S104, as the processing related to the relay method according to the present embodiment, for example, the relay device 100 can perform above-mentioned processing (1) (communication control processing) (for example, above-mentioned processing (1-1) (communication management processing) and above-mentioned processing (1-2) (transmission control processing)). Therefore, even in the case of transmitting the second information that does not include the information showing the service-related state to the operator device 300 without performing the processing in step S104, it is possible to realize an information processing system that can achieve the improvement of user's convenience, and realize the use case illustrated in FIG. 1.

Moreover, for example, in a case where a voice call by a telephone application is sent through the voice communication network 600 when the user touches "telephone icon" as illustrated in A of FIG. 1, the relay device 100 may not perform the processing in step S108.

Figure 5:
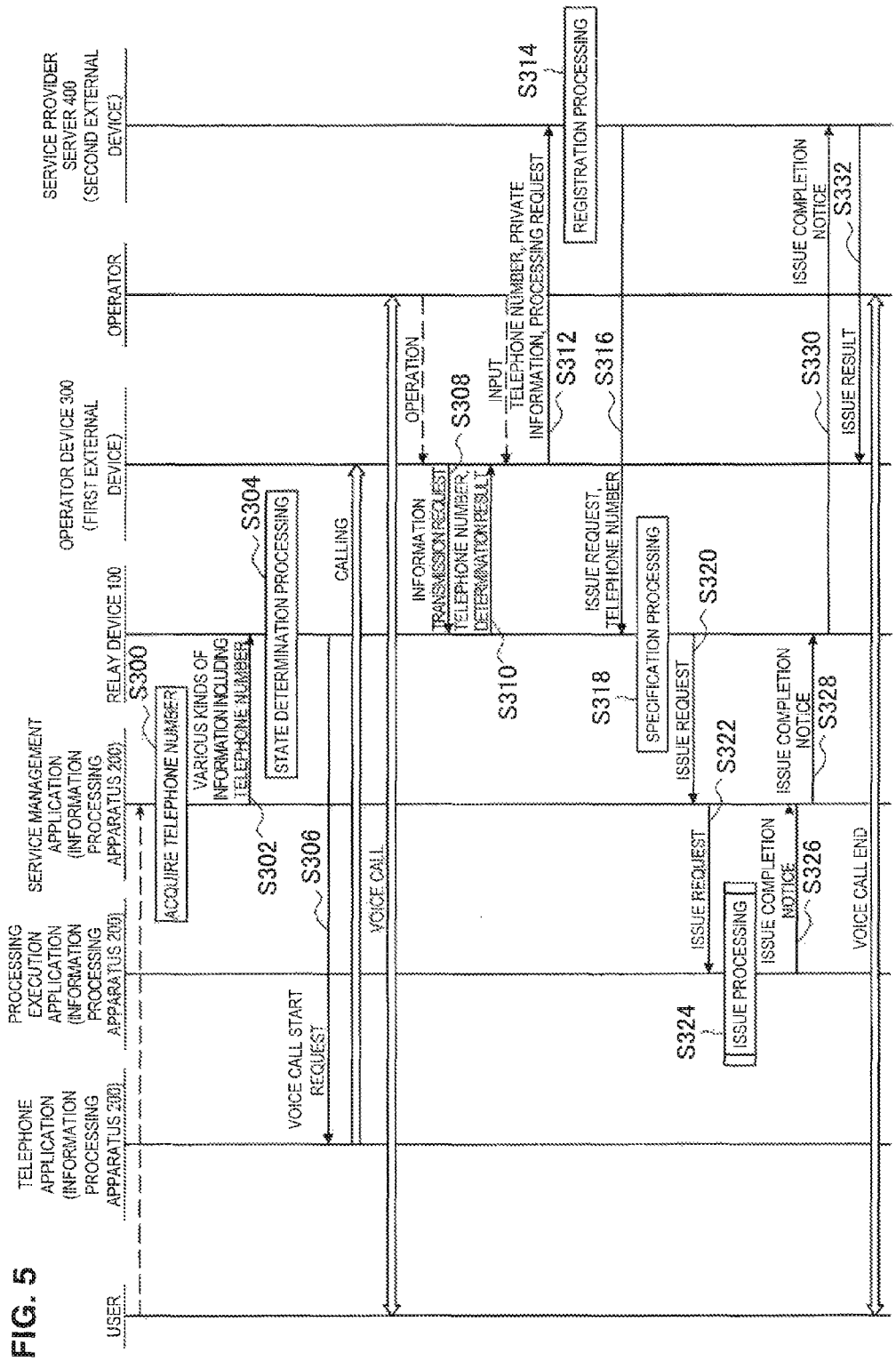
FIG. 5 is an explanatory diagram to describe the second example of processing in an information processing system according to the present embodiment.

[3-2] Second Example of Processing in Information Processing System According to the Present Embodiment FIG. 5 is an explanatory diagram to describe the second example of the processing in the information processing system according to the present embodiment. Here, the processing in step S304 of FIG. 5 corresponds to above-mentioned processing (2) (state determination processing). The processing in steps S318 and S320 of FIG. 3 corresponds to above-mentioned processing (1-2) (transmission control processing).

For example, when the user touches "telephone icon" as illustrated in A of FIG. 1, similar to step S100 of FIG. 3, the service management application in the information processing apparatus 200 acquires the telephone number of the information processing apparatus 200 (S300).

Similar to step S102 of FIG. 3, the service management application in the information processing apparatus 200 transmits the first information including the telephone number acquired in step S300 to the relay device 100 (S302).

The relay device 100 having received the first information transmitted from the information processing apparatus 200 in step S302 performs state determination processing on the basis of the received first information (S304).

Moreover, by performing above-mentioned processing (1-1) (communication management processing), the relay device 100 having received the first information maintains a session with the information processing apparatus 200 having transmitted the first information in step S302 though it is not illustrated in FIG. 5.

The relay device 100 transmits a voice call start request to the information processing apparatus 200 having transmitted the first information in step S302 (S306).

The information processing apparatus 200 having received the voice call start request transmitted from the relay device 100 in step S306 sends a voice call through the voice communication network 600 by a telephone application. Similar to FIG. 3, FIG. 5 illustrates an example where the telephone application in the information processing apparatus 200 sends a call to the operator device 300.

By the above-mentioned calling, a voice call between the user of the information processing apparatus 200 and the operator of the operator device 300 is started.

Based on operator's operation, the operator device 300 transmits an information transmission request including an information transmission instruction and the telephone number corresponding to the information processing apparatus 200 of the user who is making the voice call, to the relay device 100 (S308). As the telephone number included in the information transmission request transmitted in step S308, for example, there is a telephone number understood by "Caller ID Display" or a telephone number understood by the operator by the voice call with the user.

The relay device 100 having received the information transmission request transmitted from the operator device 300 in step S308 transmits the second information including the telephone number and information showing the service-related state showing the determination result in step S304, to the operator device 300 (S310). For example, the relay device 100 transmits the second information as a response (for example, HTTP response) to the information transmission request transmitted from the operator device 300 in step S308.

For example, when the operator who is making the voice call with the user performs operation such as an input based on the content of the voice call on the operator device 300, for example, the operator device 300 transmits the telephone number included in the first information received in step S302, user's private information and a processing request including the content of processing and a processing instruction, to the service provider server 400 (S312). In FIG. 5, similar to FIG. 3, it is assumed that the processing request for performing issue processing is transmitted from the operator device 300 to the service provider server 400.

Similar to step S112 of FIG. 3, the service provider server 400 having received various kinds of information transmitted from the operator device 300 in step S312 performs registration processing (S314). Moreover, similar to step S114 of FIG. 3, the service provider server 400 transmits the third information including the telephone number received in step S312 and an issue request related to the addition of service, to the relay device 100 (S316).

Similar to step S116 of FIG. 3, the relay device 100 having received the third information transmitted from the service provider server 400 in step S316 specifies the information processing apparatus 200 of a target to which the issue request is transmitted (S318).

Similar to step S118 of FIG. 3, the relay device 100 transmits the issue request to the information processing apparatus 200 specified in step S318 (S320).

In the information processing apparatus 200 having received the issue request transmitted from the relay device 100 in step S320, the service management application transmits the issue request to the processing execution application (S322). Further, in the information processing apparatus 200, similar to step S122 of FIG. 3, the processing execution application performs issue processing based on the issue request (S324).

When the processing in step S324 is performed, the processing execution application of the information processing apparatus 200 transmits an issue completion notice showing that the processing in step S324 is normally performed, to the service management application (S326). Further, the service management application of the information processing apparatus 200 transmits the issue completion notice transmitted in step S326, to the relay device 100 (S328).

The relay device 100 having received the issue completion notice transmitted from the information processing apparatus 200 in step S328 transmits the issue completion notice to the service provider server 400 (S330). Moreover, for example, in the case of having received the issue completion notice transmitted from the information processing apparatus 200, the relay device 100 discards the session with the information processing apparatus 200 having transmitted the issue completion notice.

The service provider server 400 having received the issue completion notice transmitted from the relay device 100 in step S330 transmits data showing the issue result to the operator device 300 (S332).

When the data showing the issue result is received in the operator device 300 in step S332, the operator can understand that an issue with respect to the information processing apparatus 200 corresponding to the user who is making a voice call is normally completed. Therefore, afterward, for example, the voice call between the operator and the user is ended when the issue is normally completed.

For example, by performing processing in the information processing system according to the second example illustrated in FIG. 5, service is issued through the voice call between the user and the operator. Therefore, for example, even in a case where the processing in the information processing system according to the first example illustrated in FIG. 3 is performed, similar to a case where the processing in the information processing system according to the first example illustrated in FIG. 3 is performed, the use case illustrated in FIG. 1 is realized.

Here, the processing in the information processing system according to the second example is not limited to the processing illustrated in FIG. 5.

For example, the relay device 100 may transmit the second information that does not include information showing the service-related state to the operator device 300 in step S310 without performing the processing in step S304.

Even in the case of transmitting the second information that does not include the service-related state to the operator device 300 without performing the processing in step S304, as the processing related to the relay method according to the present embodiment, for example, the relay device 100 can perform above-mentioned processing (1) (communication control processing) (for example, above-mentioned processing (1-1) (communication management processing) and above-mentioned processing (1-2) (transmission control processing)). Therefore, even in the case of transmitting the second information that does not include the information showing the service-related state to the operator device 300 without performing the processing in step S304, it is possible to realize an information processing system that can achieve the improvement of user's convenience, and realize the use case illustrated in FIG. 1.

Moreover, for example, in a case where a voice call by a telephone application is sent through the voice communication network 600 when the user touches "telephone icon" as illustrated in A of FIG. 1, the relay device 100 may not perform the processing in step S306.

[3-3] Third Example of Processing in Information Processing System According to the Present Embodiment In the processing in the information processing system according to the first example illustrated in FIG. 3 and the processing in the information processing system according to the second example illustrated in FIG. 5, processing in a system including the information processing system 1000 illustrated in FIG. 2 is shown. However, for example, among service providers, it is assumed that a service provider who does not set up the service provider server 400 (or a web site related to the provision of service, and so on) appears for reasons such as costs and management complication.

Therefore, next, as the third example of the processing in the information processing system according to the present embodiment, an explanation is given to one example of processing in a system including a processing device 700 that can be operated by an operator (for example, a dedicated terminal to perform issue processing, and so on) instead of the service provider server 400 in the system including the information processing system 1000 illustrated in FIG. 2.

In the following, as one example of the processing in the system including the processing device that can be operated by the operator instead of the above-mentioned service provider server 400, similar to the processing in the information processing system according to the first example illustrated in FIG. 3, processing in a case where the relay device 100 subjectively transmits the second information to the operator device 300 is shown. Here, in the system including the processing device that can be operated by the operator instead of the above-mentioned service provider server 400, similar to the processing in the information processing system according to the second example illustrated in FIG. 5, the relay device 100 may transmit the second information to the operator device 300 on the basis of an information transmission request transmitted from the operator device 300.

Figure 6:
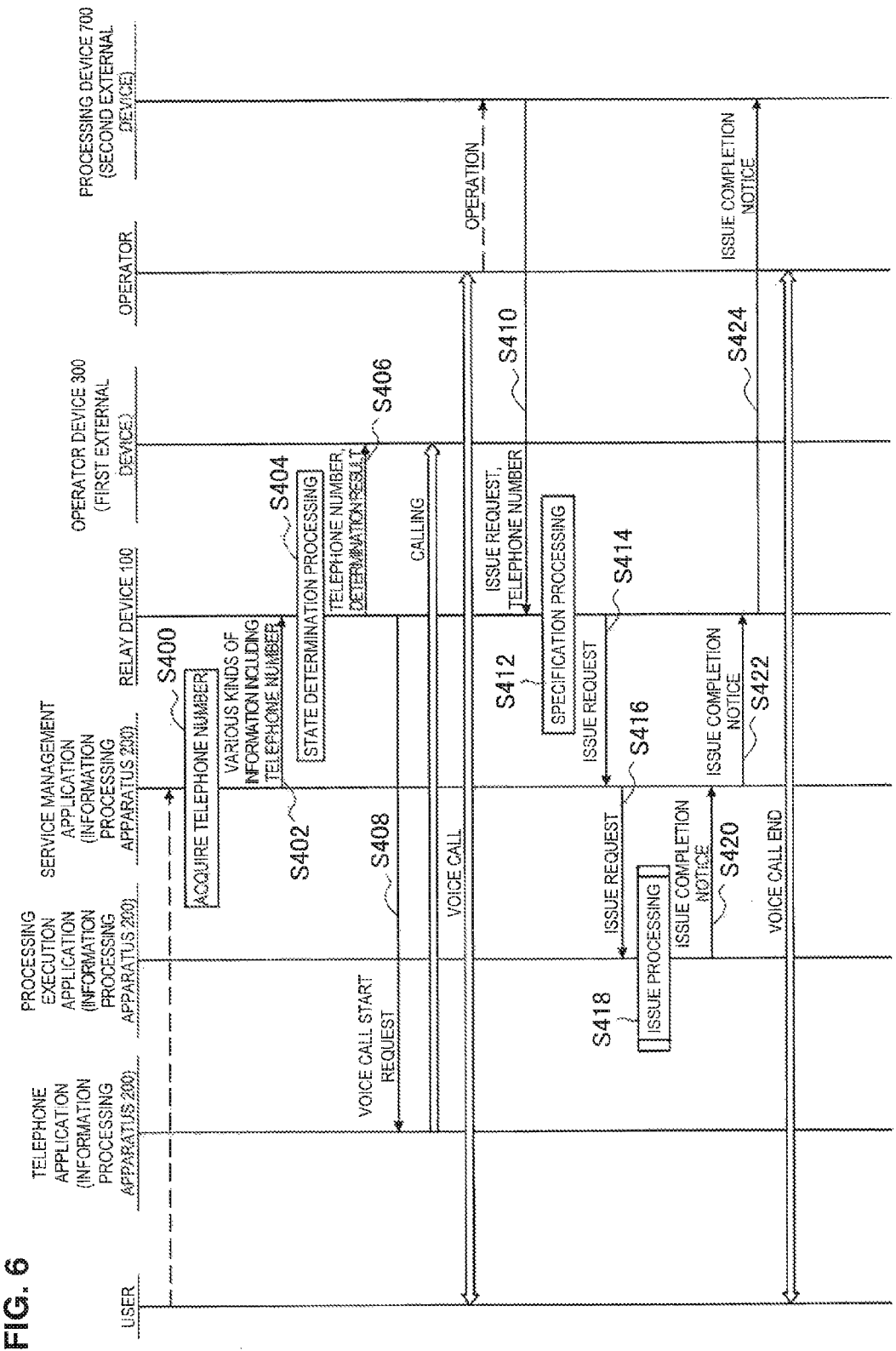
FIG. 6 is an explanatory diagram to describe the third example of processing in an information processing system according to the present embodiment.

FIG. 6 is an explanatory diagram to describe the third example of the processing in the information processing system according to the present embodiment. Here, processing in step S404 of FIG. 6 corresponds to above-mentioned processing (2) (state determination processing). Processing in steps S412 and S414 of FIG. 6 corresponds to above-mentioned processing (1-2) (transmission control processing).

For example, when the user touches "telephone icon" as illustrated in A of FIG. 1, similar to step S100 of FIG. 3, the service management application in the information processing apparatus 200 acquires the telephone number of the information processing apparatus 200 (S400).

Similar to step S102 of FIG. 3, the service management application in the information processing apparatus 200 transmits the first information including the telephone number acquired in step S400 to the relay device 100 (S402).

The relay device 100 having received the first information transmitted from the information processing apparatus 200 in step S402 performs state determination processing on the basis of the received first information (S404).

Moreover, by performing above-mentioned processing (1-1) (communication management processing), the relay device 100 having received the first information maintains a session with the information processing apparatus 200 having transmitted the first information in step S402 though it is not illustrated in FIG. 6.

When performing the state determination processing in step S404, similar to step S106 of FIG. 3, the relay device 100 transmits the second information including the telephone number and information showing the service-related state showing a determination result, to the operator device 300 (S406).

The relay device 100 transmits a voice call start request to the information processing apparatus 200 having transmitted the first information in step S402 (S408). Here, similar to the processing in the information processing system according to the first example illustrated in FIG. 3, the relay device 100 can perform the processing in step S408 before the processing in steps S404 and S406, and can also perform the processing in step S408 in parallel with the processing in steps S404 and S406.

The information processing apparatus 200 having received the voice call start request transmitted from the relay device 100 in step S408 makes a voice call through the voice communication network 600 by a telephone application. FIG. 6 illustrates an example where the telephone application in the information processing apparatus 200 makes a call to the operator device 300.

By the above-mentioned calling, a voice call between the user of the information processing apparatus 200 and the operator of the operator device 300 is started. Moreover, similar to a case where the information processing system according to the first example illustrated in FIG. 3 is used, for example, the operator can understand the service-related state in the information processing apparatus 200 of the user who is making the voice call, on the basis of the first information transmitted from the relay device 100 in step S406.

For example, when the operator who is making the voice call with the user performs operation such as an input based on the content of the voice call on the processing device 700, for example, the processing device 700 transmits the third information including the telephone number and an issue request to the relay device 100 (S410).

Similar to step S116 of FIG. 3, the relay device 100 having received the third information transmitted from the processing device 700 in step S410 specifies the information processing apparatus 200 of a target to which the issue request is transmitted, on the basis of the telephone number included in the third information (S412).

Similar to step S116 of FIG. 3, the relay device 100 transmits the issue request to the information processing apparatus 200 specified in step S412 (S414).

In the information processing apparatus 200 having received the issue request transmitted from the relay device 100 in step S414, the service management application transmits the issue request to the processing execution application (S416). Further, in the information processing apparatus 200, the processing execution application performs issue processing based on the issue request (S418). Here, for example, the processing execution application of the information processing apparatus 200 performs processing similar to FIG. 4 with the processing device 700.

When the processing in step S418 is performed, the processing execution application of the information processing apparatus 200 transmits an issue completion notice showing that the processing in step S418 is normally performed, to the service management application (S420). Further, the service management application of the information processing apparatus 200 transmits the issue completion notice transmitted in step S420, to the relay device 100 (S422).

The relay device 100 having received the issue completion notice transmitted from the information processing apparatus 200 in step S422 transmits the issue completion notice to the processing device 700 (S424). Moreover, for example, in the case of having received the issue completion notice transmitted from the information processing apparatus 200, the relay device 100 discards the session with the information processing apparatus 200 having transmitted the issue completion notice.

When the issue completion notice is received in the processing device 700 in step S424, the operator can understand that an issue with respect to the information processing apparatus 200 corresponding to the user who is making a voice call is normally completed. Therefore, afterward, for example, the voice call between the operator and the user is ended when the issue is normally completed.

Here, for example, when the processing in step S418 (for example, processing similar to FIG. 4 between the information processing apparatus 200 and the processing device 700) is performed, in a case where the operator can understand that the issue with respect to the information processing apparatus 200 corresponding to the user who is making the voice call is normally completed, the voice call between the operator and the user may be ended after the processing in step S418.

For example, when the processing in the information processing system according to the third example illustrated in FIG. 6 is performed, service is issued through the voice call between the user and the operators Therefore, for example, when the processing in the information processing system according to the third example illustrated in FIG. 6 is performed, the use case illustrated in FIG. 1 is realized.

Here, the processing in the information processing system according to the third example is not limited to the processing illustrated in FIG. 6.

For example, similar to a modification example of the processing in the information processing system according to the first example illustrated in FIG. 3, the relay device 100 may transmit the second information that does not include information showing the service-related state to the operator device 300 in step S406 without performing the processing in step S404.

Moreover, for example, in a case where a voice call by a telephone application is sent through the voice communication network 600 when the user touches "telephone icon" as illustrated in A of FIG. 1, similar to the modification example of the processing in the information processing system according to the first example illustrated in FIG. 3, the relay device 100 may not perform the processing in step S408.

[3-4] Other Examples of Processing in Information Processing System According to the Present Embodiment In the processing in the information processing system according to the first example illustrated in FIG. 3, the processing in the information processing system according to the second example illustrated in FIG. 5 and the processing in the information processing system according to the third example illustrated in FIG. 6, an example is shown where three applications of the telephone application, the processing execution application and the service management application are executed in the information processing apparatus 200 and processing is performed by these applications.

However, the processing in the information processing apparatus 200 according to the present embodiment is not limited to the above. For example, the processing in the information processing apparatus 200 according to the present embodiment may be performed by an application in which the functions of three above-mentioned applications is summarized to one (for example, an application in which the telephone function and the web plug-in function are integrated).

Configuration example of relay device and information processing apparatus forming information processing system according to the present embodiment Next, one example of the configurations of the relay device, and the information processing apparatus that form the information processing system according to the present embodiment is described.

[4-1] Relay Device 100

Figure 7:
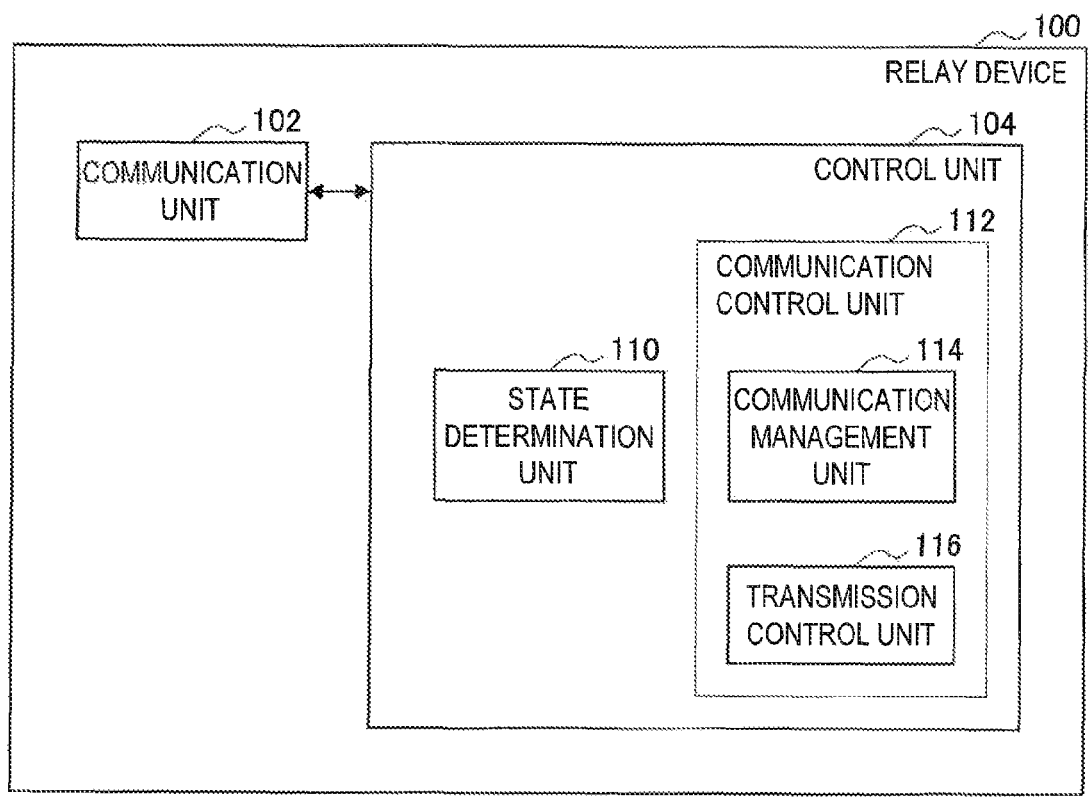
FIG. 7 is a block diagram illustrating one example of the configuration of a relay device according to the present embodiment.

FIG. 7 is a block diagram illustrating one example of the configuration of the relay device 100 according to the present embodiment. For example, the relay device 100 includes a communication unit 102 and a control unit 104.

The relay device 100 may also include, for example, a ROM (Read Only Memory, not shown), a RAM (Random Access Memory, not shown), a storage unit (not shown), an operation unit (not shown) that can be operated by the user, and a display unit (not shown) that displays various screens on the display screen. The relay device 100 connects each of the above elements by, for example, a bus as a transmission path.

The ROM (not shown) stores programs used by the control unit 104 and control data such as operation parameters. The RAM (not shown) temporarily stores programs executed by the control unit 104 and the like.

The storage unit (not shown) is a storage mechanism included in the relay device 100 and stores, for example, data related to the relay processing method according to an embodiment such as database with which the service identification information, the storage area and the application are associated. As the storage unit (not shown), for example, a magnetic recording medium such as a hard disk and a nonvolatile memory such as a flash memory can be cited. The storage unit (not shown) may be removable from the relay device 100.

As the operation unit (not shown), an operation input device described later can be cited. As the display unit (not shown), a display device described later can be cited.

[Hardware Configuration Example of the Relay Device 100]

Figure 8:
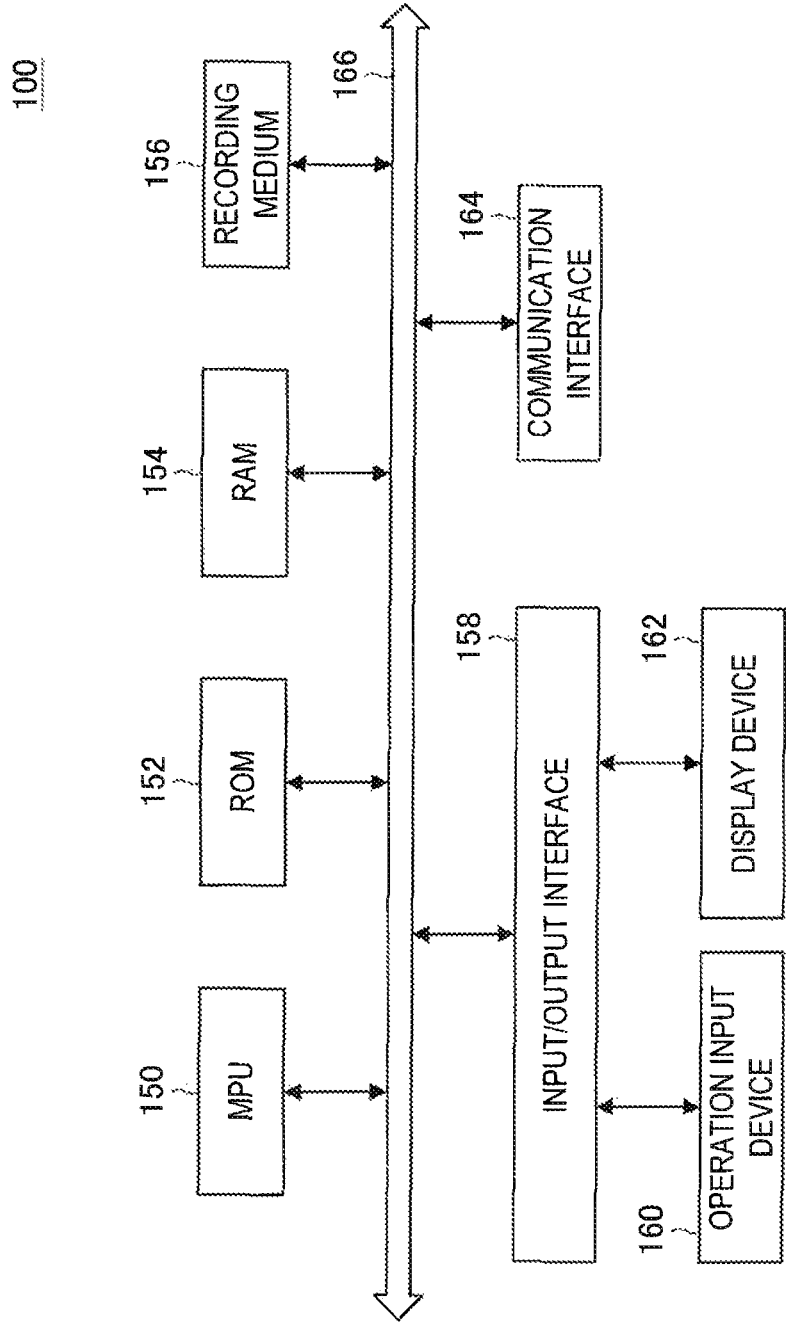
FIG. 8 is an explanatory diagram illustrating one example of the hardware configuration of a relay device according to the present embodiment.

FIG. 8 is an explanatory view showing an example of the hardware configuration of the relay device 100 according to an embodiment. The relay device 100 includes, for example, an MPU 150, a ROM 152, a RAM 154, a recording medium 156, an input/output interface 158, an operation input device 160, a display device 162, and a communication interface 164. The relay device 100 connects each structural element by, for example, a bus 166 as a transmission path of data.

The MPU 150 is constituted of one or more processors configured by an operation circuit such as a MPU (Micro Processing Unit) and various processing circuits and functions as the control unit 104 that controls the whole the relay device 100. The MPU 150 also plays the role of, for example, a later-described state determination unit 110 and a communication control unit 112 in the relay device 100.

The ROM 152 stores programs used by the MPU 150 and control data such as operation parameters. The RAM 154 temporarily stores programs executed by the MPU 150 and the like.

The recording medium 156 functions as a storage unit (not shown) and stores, for example, data related to the relay processing method according to an embodiment such as database with which the service identification information, the storage area and the application are associated. As the recording medium 156, for example, a magnetic recording medium such as a hard disk and a nonvolatile memory such as a flash memory can be cited. The recording medium 156 may be removable from the relay device 100.

The input/output interface 158 connects, for example, the operation input device 160 and the display device 162. The operation input device 160 functions as an operation unit (not shown) and the display device 162 functions as a display unit (not shown). As the input/output interface 158, for example, a USB (Universal Serial Bus) terminal, a DVI (Digital Visual Interface) terminal, an HDMI (High-Definition Multimedia Interface) (registered trademark) terminal, and various processing circuits can be cited.

The operation input device 160 is, for example, included in the relay device 100 and connected to the input/output interface 158 inside the relay device 100. As the operation input device 160, for example, a button, a direction key, a rotary selector such as a jog dial, and a combination of these devices can be cited.

The display device 162 is, for example, included in the relay device 100 and connected to the input/output interface 158 inside the relay device 100. As the display device 162, for example, a liquid crystal display and an organic electro-luminescence display (also called an OLED display (Organic Light Emitting Diode Display)) can be cited.

It is needless to say that the input/output interface 158 can also be connected to an external device such as an external operation input device (for example, a keyboard and a mouse) and an external display device as an external apparatus of the relay device 100. The display device 162 may be a device capable of both the display and user operations like, for example, a touch screen.

The communication interface 164 is a communication mechanism included in the relay device 100 and functions as the communication unit 102 to communicate with an external apparatus such as the information processing apparatus 200, the operator device 300, the service provider server 400 via the network 500 (or directly) wirelessly or through a wire. As the communication interface 164, for example, a communication antenna and RF (Radio Frequency) circuit (wireless communication), an IEEE802.1.5.1 port and transmitting/receiving circuit (wireless communication), an IEEE802.11 port and transmitting/receiving circuit (wireless communication), and a LAN terminal and transmitting/receiving circuit (wire communication) can be cited.

For example, with the configuration illustrated in FIG. 8, the relay device 100 performs processing related to the relay processing method according to the present embodiment. Here, the hardware configuration of the relay device 100 according to the present embodiment is not limited to the configuration illustrated in FIG. 8.

For example, in the case of performing communication with an external device through a connected external communication device, the relay device 100 may not include the communication interface 164. Moreover, the relay device 100 can also adopt a configuration in which the recording medium 156, the operation input device 160 and the display device 162 are not included.

Referring to FIG. 7 again, one example of the configuration of the relay device 100 is described. The communication unit 102 is a communication mechanism included in the relay device 100, and performs communication with an external device by wireless or wire connection through the network 500 (or directly). Moreover, in the communication unit 102, for example, communication is controlled by the control unit 104.

As the communication unit 102, for example, a communication antenna and RF circuit and a LAN terminal and transmitting/receiving circuit can be cited, but the configuration of the communication unit 102 is not limited to the above example. For example, the communication unit 102 may adopt a configuration conforming to any standard capable of communication such as a USB terminal and transmitting/receiving circuit or any configuration capable of communicating with an external apparatus via the network 500.

The control unit 104 is configured by, for example, an MPU and plays the role of controlling the whole the relay device 100. The control unit 104 includes, for example, the state determination unit 110 and the communication control unit 112 and plays a leading role of performing the processing according to the relay processing method according to an embodiment.

The state determination unit 110 plays a role to initiatively perform above-mentioned processing (2) (state determination processing), and, in a case where the first information is acquired, it determines the service-related state in the information processing apparatus having transmitted the first information, on the basis of the service identification information and information on the storage state.

The communication control unit 112 plays a role to initiatively perform above-mentioned processing (1) (communication control processing) and controls communication with an external device. To be more specific, for example, the communication control unit 112 includes a communication management unit 114 and a transmission control unit 116, and performs above-mentioned processing (1-1) (communication management processing) and above-mentioned processing (1-2) (transmission control processing).

Here, as mentioned above, above-mentioned processing (1-1) (communication management processing) and above-mentioned processing (1-2) (transmission control processing) are formed by dividing above-mentioned processing (1) (communication control processing) into two items of processing for convenience' sake. Therefore, the configuration of the communication control unit 112 is not limited to the configuration illustrated in FIG. 7, and it is possible to adopt a configuration based on the way of processing division in above-mentioned processing (1) (communication control processing).

Moreover, for example, one or two or more processors, and so on, play a role of the communication control unit 112 in the information processing apparatus 200. For example, without depending on the way of processing division in above-mentioned processing (1) (communication control processing), the communication control unit 112 may perform processing by one processor, and so on, or may share and perform processing by multiple processors, and so on.

In the following, a case where the communication control unit 112 includes the communication management unit 114 and the transmission control unit 116 is exemplified, and the communication management unit 114 and the transmission control unit 116 are described respectively.

The communication management unit 114 plays a role to initiatively perform above-mentioned processing (1-1)

(communication management processing), and, in a case where the first information is acquired, it maintains a session with the information processing apparatus having transmitted the first information. Here, for example, by controlling communication in the communication unit 102 or a connected external communication device, the communication management unit 114 maintains the session with the information processing apparatus having transmitted the first information.

The transmission control unit 116 plays a role to initiatively perform above-mentioned processing (1-2) (transmission control processing).

The transmission control unit 116 transmits the second information including specific information included in the first information to the first external device such as the operator device 300. Here, the second information transmitted by the transmission control unit 116 may include information showing the service-related state determined in the state determination unit 110.

Moreover, in a case where the third information is acquired from the first external device such as the operator device 300 or the second external device such as the service provider server 400 after the second information is transmitted, the transmission control unit 116 specifies the information processing apparatus having transmitted the first information, on the basis of specific information included in the acquired third information. Further, the transmission control unit 116 transmits information included in the third information to the specified information processing apparatus by the session maintained by the communication management unit 114.

Here, for example, by controlling communication in the communication unit 102 or the connected external communication device, the transmission control unit 116 transmits various kinds of information (data) to the communication unit 102 or the external communication device.

For example, by including the state determination unit 110 and the communication control unit 112, the control unit 104 initiatively performs processing related to the relay processing method according to the present embodiment.

For example, with the configuration illustrated in FIG. 7, the relay device 100 performs the processing related to the relay processing method according to the present embodiment (for example, above-mentioned processing (1) (communication control processing) and above-mentioned processing (2) (state determination processing)).

Therefore, for example, with the configuration illustrated in FIG. 7, the relay device 100 can realize an information processing system that can achieve the improvement of user's convenience.

Moreover, for example, with the configuration illustrated in FIG. 7, the relay device 100 can provide an effect provided by performing the processing related to the relay processing method according to the present embodiment as mentioned above, for example.

Here, the configuration of the relay device according to the present embodiment is not limited to the configuration illustrated in FIG. 7.

For example, the relay device according to the present embodiment can adopt a configuration in which the state determination unit 110 illustrated in FIG. 7 is not included. Even in the case of adopting the configuration in which the state determination unit 110 is not included, the relay device according to the present embodiment can perform above-mentioned processing (1) (communication control processing). Therefore, even in the case of adopting the configuration in which the state determination unit 110 is not included, the relay device according to the present embodiment can realize an information processing system that can achieve the improvement of user's convenience.

Moreover, for example, the relay device according to the present embodiment can adopt a configuration in which the communication management unit 114 illustrated in FIG. 7 is not included. In the case of adopting the configuration in which the communication management unit 114 is not included, for example, the communication control unit 112 (for example, the transmission control unit 116) transmits information to the information processing apparatus 200 specified using SMS in the relay device according to the present embodiment.

Moreover, for example, the relay device according to the present embodiment can include one or both of the state determination unit 110 and the communication control unit 112 illustrated in FIG. 7 separately from the control unit 104 (for example, realize them by another processing circuit).

Moreover, for example, in the case of performing communication with an external device through an external communication device having the function and configuration similar to the communication unit 102, the relay device according to the present embodiment may not include the communication unit 102.

[4-2] Information Processing Apparatus 200

Figure 9:
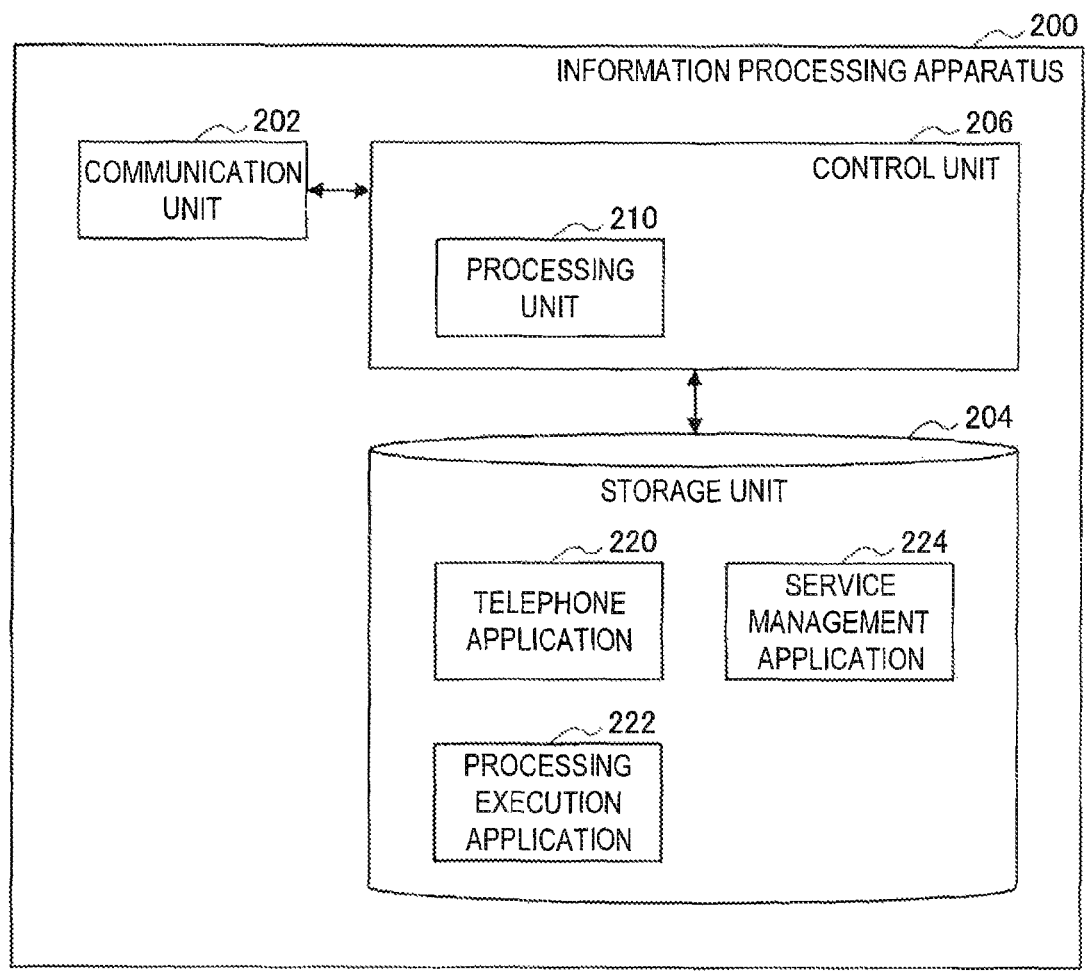
FIG. 9 is a block diagram illustrating one example of the configuration of an information processing apparatus according to the present embodiment.

FIG. 9 is a block diagram illustrating one example of the configuration of the information processing apparatus 200 according to the present embodiment. For example, the information processing apparatus 200 includes a communication unit 202, a storage unit 204 and a control unit 206.

Moreover, for example, the information processing apparatus 200 may include a ROM (not shown), a RAM (not shown), a storage unit (not shown), an operation unit (not shown) that can be operated by the user of the information processing apparatus 200, a display screen (not shown) that displays various screens on a display screen, and an NFC processing unit (not shown) having a communication function and processing function related to NFC, and so on. For example, the information processing apparatus 200 connects each above-mentioned component by a bus as a data transmission path.

The ROM (not shown) stores programs used by the control unit 206 and control data such as operation parameters. The RAM (not shown) temporarily stores programs executed by the control unit 206 and the like.

As the operation unit (not shown), an operation input device described later can be cited. As the display unit (not shown), a display device described later can be cited. As the NFC processing unit (not shown), an IC chip and an antenna described later can be cited.

[Hardware Configuration Example of the Information Processing Apparatus 200]

Figure 10:
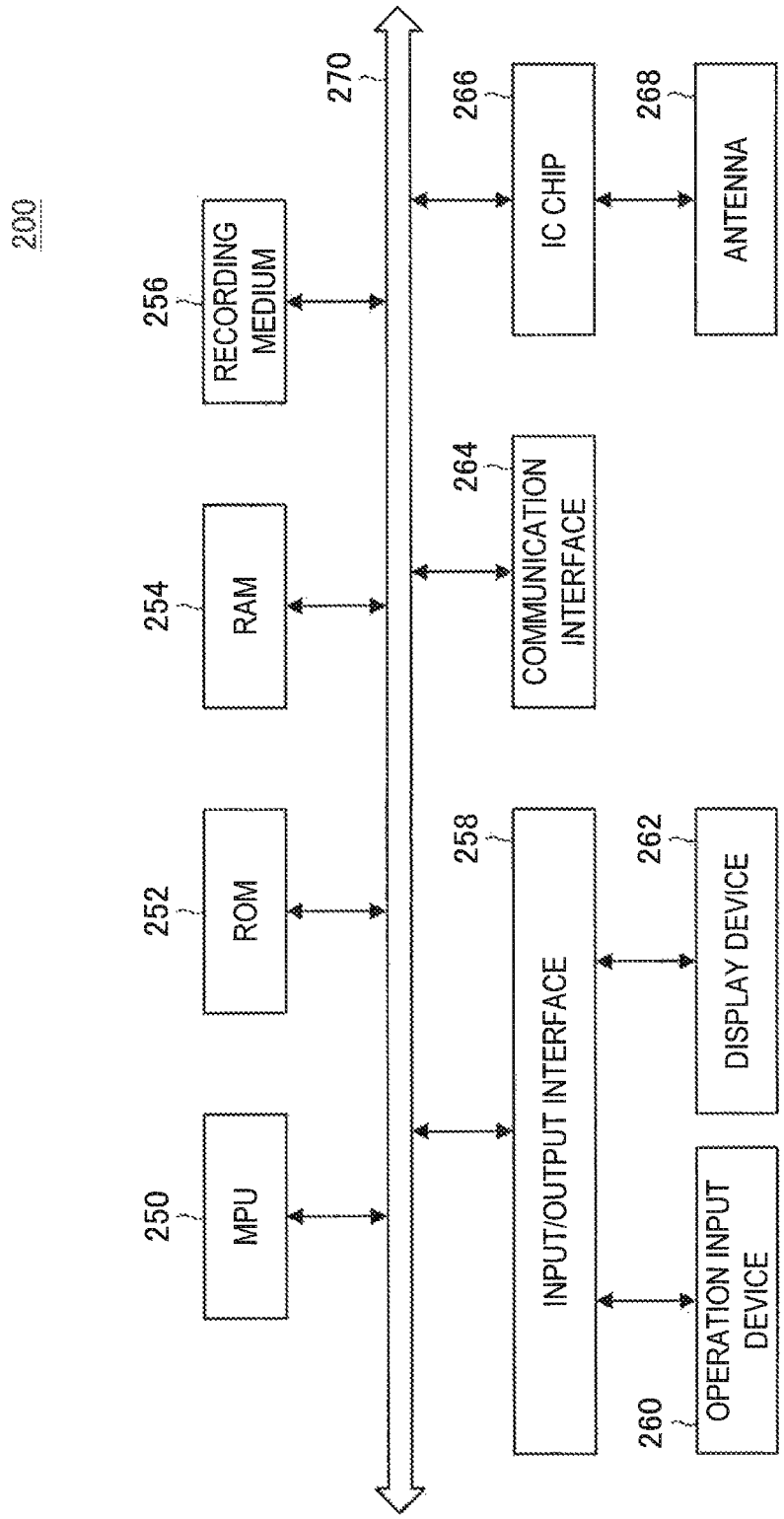
FIG. 10 is an explanatory diagram illustrating one example of the hardware configuration of an information processing apparatus according to the present embodiment.

FIG. 10 is an explanatory view showing an example of the hardware configuration of the information processing apparatus 200 according to an embodiment. The information processing apparatus 200 includes, for example, an MPU 250, a ROM 252, a RAM 254, a recording medium 256, an input/output interface 258, an operation input device 260, a display device 262, a communication interface 264, an IC chip 266, and an antenna 268. The information processing apparatus 200 connects each structural element by, for example, a bus 270 as a transmission path of data.

The MPU 250 is constituted of a processor configured by an operation circuit such as a MPU and various processing circuits and functions as the control unit 206 that controls the whole information processing apparatus 200. The MPU 250 also plays the role of, for example, a processing unit 210 described later in the information processing apparatus 200.

The ROM 252 stores programs used by the MPU 250 and control data such as operation parameters. The RAM 254 temporarily stores programs executed by the MPU 250 and the like.

The recording medium 256 functions as the storage unit 204, and, for example, stores various kinds of data such as a telephone application, a processing execution application to perform various kinds of processing, and a service management application. As the recording medium 256, for example, a magnetic recording medium such as a hard disk and a nonvolatile memory such as a flash memory can be cited. The recording medium 256 may be removable from the information processing apparatus 200.

The input/output interface 258 connects, for example, the operation input device 260 and the display device 262. The operation input device 260 functions as an operation unit (not shown) and the display device 262 functions as a display unit (not shown). As the input/output interface 258, for example, a USB terminal, a DVI terminal, an HDMI (registered trademark) terminal, and various processing circuits can be cited.

The operation input device 260 is, for example, included in the information processing apparatus 200 and connected to the input/output interface 258 inside the information processing apparatus 200. As the operation input device 260, for example, a button, a direction key, a rotary selector such as a jog dial, and a combination of these devices can be cited.

The display device 262 is, for example, included in the information processing apparatus 200 and connected to the input/output interface 258 inside the information processing apparatus 200. As the display device 262, for example, liquid crystal display and an organic electro-luminescence display can be cited.

It is needless to say that the input/output interface 258 can also be connected to an external device such as an external operation input device (for example, a keyboard and a mouse) and an external display device as an external apparatus of the information processing apparatus 200. The display device 262 may be a device capable of both the display and user operations like, for example, a touch screen.

The communication interface 264 is a communication mechanism included in the information processing apparatus 200 and functions as the communication unit 202. For example, the communication interface 264 performs communication with an external device such as the relay device 100 by wireless or wire connection through the network 500 (or directly). Moreover, for example, the communication interface 264 performs communication related to a voice call with the external device through the voice communication network 600.

As the communication interface 264, for example, a communication antenna and RF (Radio Frequency) circuit (wireless communication), an IEEE802.15.1 port and transmitting/receiving circuit (wireless communication), an IEEE802.11 port and transmitting/receiving circuit (wireless communication), and a LAN terminal and transmitting/receiving circuit (wire communication) can be cited. Here, in the communication interface 264, the device related to the communication through the network 500 (or direct communication) and the device related to the communication related to the voice call may be a common device or may be different devices.

The IC chip 266 and the antenna 268 are other communication mechanisms included in the information processing apparatus 200, and, for example, perform communication by NFC with an external device such as a reader and a writer by carrier waves of a predetermined frequency such as 13.56 [MHz]. The antenna 268 receives the carrier waves and plays a role to transmit a response signal. Moreover, the IC chip 266 demodulates and processes a carrier wave signal transmitted from an external device such as a reader and a writer, on the basis of the received carrier waves, and transmits the response signal by load modulation.

Figure 11:
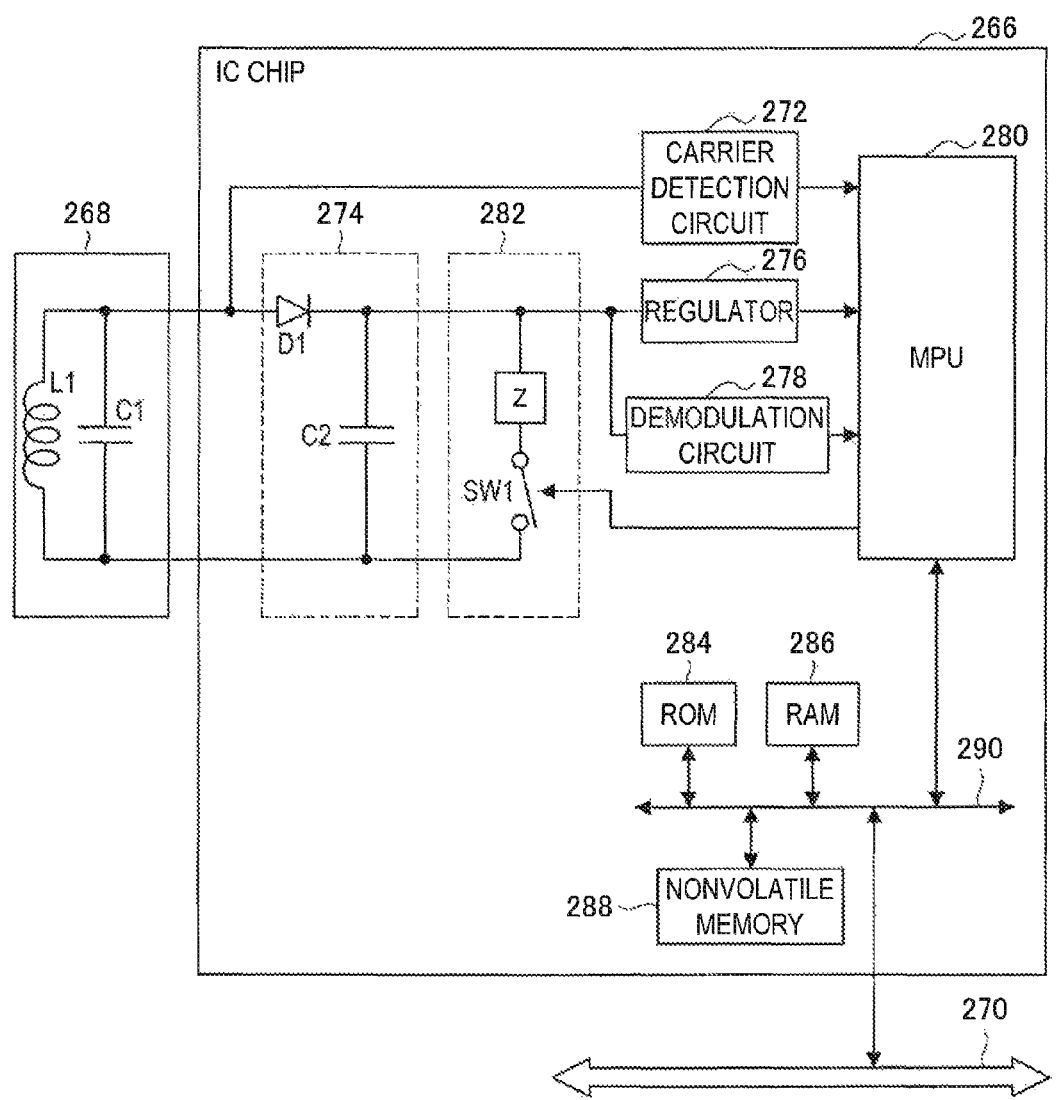
FIG. 11 is an explanatory diagram illustrating one example of the configurations of the IC chip and antenna illustrated in FIG. 10.

FIG. 11 is an explanatory diagram illustrating one example of the configurations of the IC chip 266 and the antenna 268 illustrated in FIG. 10. Here, for example, the information processing apparatus 200 may not have the configuration of the IC chip 266 illustrated in FIG. 11 in an IC chip format.

For example, the antenna 268 is configured with a resonance circuit including coil (inductor) L1 having predetermined inductance and capacitor C1 having predetermined electrostatic capacity, and causes induced voltage by electromagnetic induction according to the reception of carrier waves. Further, the antenna 268 outputs a reception voltage at which the induced voltage is resonated by a predetermined resonance frequency. Here, for example, the resonance frequency in the antenna 268 is set according to the frequency of carrier waves such as 13.56 [MHz]. With the above-mentioned configuration, the antenna 268 receives the carrier waves or transmits a response signal by load modulation performed in a load modulation circuit 282 included in the IC chip 266.

The IC chip 266 includes a carrier detection circuit 272, a detection circuit 274, a regulator 276, a demodulation circuit 278, a MPU 280 and the load modulation circuit 282. Here, for example, the IC chip 266 may further include a protection network (not shown) to prevent overvoltage and overcurrent from being applied to the MPU 280 though it is not illustrated in FIG. 11. Here, as the protection network (not shown), for example, there is a clamp circuit formed with a diode, and so on.

Moreover, for example, the IC chip 266 includes a ROM 284, a RAM 286 and a nonvolatile memory 288. For example, the MPU 280, the ROM 284, the RAM 286 and the nonvolatile memory 288 are connected by a bus 290 as a data transmission path. Moreover, the bus 290 is connected with the bus 270.

The ROM 284 stores data for control such as a program used by the MPU 280 and an operation parameter. The RAM 286 temporarily stores the program executed by the MPU 280, the computation result and the execution state, and so on.

For example, the nonvolatile memory 288 stores various kinds of data such as an electronic value (money or data having a value based on money) and an application. Here, as the nonvolatile memory 288, for example, there are an EEPROM (Electrically Erasable and Programmable Read Only Memory) and a flash memory, and so on. Moreover, for example, the nonvolatile memory 288 has tamper resistance.

For example, the carrier detection circuit 272 generates a rectangular detection signal on the basis of the reception voltage transmitted from the antenna 268, and transmits the detection signal to the MPU 280. Moreover, for example, the MPU 280 uses the above-mentioned transmitted detection signal as a processing clock for data processing. Here, since the above-mentioned detection signal is based on the reception voltage transmitted from the antenna 268, it is assumed to be synchronized with the frequency of carrier waves transmitted from an external device such as a reader and a writer. Therefore, by including the carrier detection circuit 272, the IC chip 266 can perform processing with the external device such as the reader and the writer in synchronization with the external device.

The detection circuit 274 rectifies the reception voltage output from the antenna 268. Here, for example, the detection circuit 274 is formed with diode D1 and capacitor C2.

The regulator 276 achieves the smoothing and constant voltage of the reception voltage and outputs a driving voltage to the MPU 280. Here, the regulator 276 uses the direct-current component of the reception voltage as a driving voltage.

The demodulation circuit 278 demodulates a carrier wave signal on the basis of the reception voltage and outputs data (for example, binarized data signals of the high level and low level) corresponding to a carrier wave signal included in a carrier wave. Here, the demodulation circuit 278 outputs the alternating-current component of the reception voltage as data.

The MPU 280 is driven using the driving voltage output from the regulator 276 as a power supply, and performs processing of the data demodulated in the demodulation circuit 278. Here, for example, the MPU 280 is formed with a MPU (Micro Processing Unit) and various processing circuits, and so on.

Moreover, the MPU 280 selectively generates a control signal that controls the load modulation related to a response to an external device such as a reader and a writer, according to the processing result. Further, the MPU 280 selectively outputs the control signal to the load modulation circuit 282.

For example, the load modulation circuit 282 includes load Z and switch SW1, and performs load modulation by selectively connecting (validating) load Z according to the control signal transmitted from the MPU 280. Here, for example, load Z is formed with resistance having a predetermined resistance value. Moreover, for example, switch SW1 is formed with a p-channel MOSFET (Metal Oxide Semiconductor Field effect transistor) or an n-channel MOSFET.

With the above-mentioned configuration, the IC chip 266 can process the carrier wave signal received in the antenna 268 and transmit a response signal to the antenna 268 by load modulation.

For example, with the configuration illustrated in FIG. 11, the IC chip 266 and the antenna 268 perform communication by NFC with an external device such as a reader and a writer by the use of carrier waves of a predetermined frequency. Here, it is needless to say that the configurations of the IC chip 266 and the antenna 268 according to the present embodiment are not limited to the example illustrated in FIG. 11.

For example, with the configuration illustrated in FIG. 10, the information processing apparatus 200 performs each processing in the information processing apparatus 200 illustrated in FIG. 3 to FIG. 6. Here, the hardware configuration of the information processing apparatus 200 according to the present embodiment is not limited to the configuration illustrated in FIG. 10.

For example, in the case of performing communication with an external device through a connected external communication device, the information processing apparatus 200 may not include the communication interface 264. Moreover, the information processing apparatus 200 can also adopt a configuration in which the recording medium 156, the operation input device 160 and the display device 162 are not included.

Moreover, the information processing apparatus 200 can also adopt a configuration in which the IC chip 266 and the antenna 268 are not included, that is, a configuration in which a communication function by NFC and a processing function are not included.

Referring to FIG. 9 again, one example of the configuration of the information processing apparatus 200 is described. The communication unit 202 is a communication mechanism included in the information processing apparatus 200. For example, the communication unit 202 performs communication with an external device such as the relay device 100 by wireless or wire connection through the network 500 (or directly). Moreover, for example, the communication unit 202 performs communication related to a voice call with the external device through the voice communication network 600. Moreover, in the communication unit 202, for example, the communication is controlled by the control unit 206.

As the communication unit 202, for example, a communication antenna and RF circuit and a LAN terminal and transmitting/receiving circuit can be cited, but the configuration of the communication unit 102 is not limited to the above example. For example, the communication unit 102 may adopt a configuration conforming to any standard capable of communication such as a USB terminal and transmitting/receiving circuit or any configuration capable of communicating with an external apparatus via the network 500. Moreover, for example, the communication unit 202 may realize a communication function through the network 500 (or direct communication function) and a communication function related to the voice call by a common device or different devices.

The storage unit 204 is a storage mechanism included in the information processing apparatus 200, and, for example, stores various kinds of data such as a telephone application, a processing execution application to perform various kinds of processing, and a service management application. FIG. 9 illustrates an example where a telephone application 220, one processing execution application 222 and a service management application 224 are stored in the storage unit 204.

Here, as the storage unit 204, for example, there are a magnetic recording medium such as a hard disk, and a nonvolatile memory such as a flash memory, and so on. Moreover, the storage unit 204 may be detachable from the information processing apparatus 200.

For example, the control unit 206 is formed with an MPU, and so on, and plays a role to control the whole of the information processing apparatus 200. For example, the control unit 206 includes the processing unit 210, and, by executing an application stored in the storage unit 204, the processing unit 210 initiatively performs each processing in the information processing apparatus 200 illustrated in FIG. 3 to FIG. 6.

For example, with the configuration illustrated in FIG. 9, the information processing apparatus 200 performs each processing in the information processing apparatus 200 illustrated in FIG. 3 to FIG. 6. Therefore, when the information processing apparatus 200 has the configuration illustrated in FIG. 9, processing in a system including an information processing system that can achieve the improvement of user's convenience as illustrated in FIG. 3, FIG. 5 and FIG. 6 is realized.

Here, the configuration of the information processing apparatus according to the present embodiment is not limited to the configuration illustrated in FIG. 9.

For example, the information processing apparatus according to the present embodiment can include, for example, the processing unit 210 illustrated in FIG. 9 separately from the control unit 206 (for example, realize it by another processing circuit).

Moreover, for example, in the case of performing communication with an external device through an external communication device having the function and configuration similar to the communication unit 102, the information processing apparatus according to the present embodiment may not include the communication unit 202.

Moreover, for example, in a case where various applications such as a telephone application are stored in a connected external recording medium or in a case where various applications are stored in the nonvolatile memory 288 of the IC chip 266 forming an NFC processing unit (not shown) included in the information processing apparatus according to the present embodiment, the information processing apparatus according to the present embodiment can also adopt a configuration in which the storage unit 204 is not included.

An explanation has been described above using a relay device as a component of the information processing system according to the present embodiment, but the present embodiment is not limited to this mode. For example, the present embodiment can be applied to various kinds of equipment that can perform processing related to the relay method according to the present embodiment, such as computers including a PC (Personal Computer) and a server. Moreover, for example, the present embodiment can be applied to a processing IC (Integrated Circuit) that can be incorporated in the equipment as mentioned above.

Moreover, for example, the relay device according to the present embodiment may be realized by a system formed with multiple devices assuming connection with a network (or communication between respective devices) like cloud computing, and so on. That is, for example, it is also possible to realize the above-mentioned relay device according to the present embodiment as a relay processing system formed with multiple devices that perform processing related to the relay method according to the present embodiment in cooperation.

Moreover, an explanation has been described using an information processing apparatus as a component of the information processing system according to the present embodiment, but the present embodiment is not limited to this mode. For example, the present embodiment can be applied to various kinds of equipment such as communication devices including a mobile phone and a smart phone, a tablet device, computers including a PC, a display device, a television receiver, an image/music player (or image/music record player) and a game machine. Moreover, for example, the present embodiment can be applied to a processing IC that can be incorporated in the above-mentioned equipment.

Program According to the Present Embodiment

When a program that causes a computer to function as the relay device according to the present embodiment (for example, a program that can perform processing according to the relay method according to the present embodiment, such as "above-mentioned processing (1) (communication control processing) (for example, above-mentioned processing (1-1) (communication management processing) and above-mentioned processing (1-2) (transmission control processing))" and "above-mentioned processing (1) (communication control processing) and above-mentioned processing (2) (state determination processing)") is executed by a processor in a computer, it is possible to realize an information processing system that can achieve the improvement of user's convenience.

Also, effects achieved by the above processing according to the relay processing method according to an embodiment can be achieved by a program causing a computer to function as a relay device according to an embodiment being performed by a processor or the like in the computer.

It should be understood by those skilled in the art that various modifications, combinations, sub-combinations and alterations may occur depending on design requirements and other factors insofar as they are within the scope of the appended claims or the equivalents thereof.

For example, the above shows that a program computer program) causing a computer to function as a relay device according to an embodiment is provided, but an embodiment can further provide a recording medium caused to store the program.

The above configuration shows an example of an embodiment and naturally comes under the technical scope of the present disclosure.

Effects described in this specification are only descriptive or illustrative and are not restrictive. That is, the technology according to the present disclosure can achieve other effects obvious to a person skilled in the art from the description of this specification, together with the above effects or instead of the above effects.

Additionally, the present technology may also be configured as below.

(1) A relay device including:

a communication control unit configured to control communication with an external device, wherein the communication control unit maintains a session with an information processing apparatus that transmits first information when the first information including specific information that is able to specify a calling party in a voice call is acquired by communication, causes second information including the specific information included in the first information to be transmitted to a first external device, specifies the information processing apparatus having transmitted the first information on the basis of the specific information included in acquired third information when the third information including the specific information and information for transmission is acquired from the first external device or a second external device after the second information is transmitted, and causes information included in the third information to be transmitted to the specified information processing apparatus by the maintained session.

(2) The relay device according to (1), wherein the third information includes a processing request for performing predetermined processing as the information for transmission, and wherein the communication control unit causes the processing request to be transmitted to the specified information processing apparatus.

(3) The relay device according to (1) or (2), wherein the first information further includes service identification information showing service, and information on a storage state of data in the information processing apparatus, wherein a state determination unit configured to determine a service-related state in the information processing apparatus having transmitted the first information, on the basis of the service identification information and the information on the storage state when the first information is acquired, is further included, and wherein the communication control unit causes second information including information showing the service-related state to be transmitted to the first external device.

(4) The relay device according to (3),
wherein the information on the storage state is information showing a storage area of a recording medium included in the information processing apparatus and information showing an application installed in the information processing apparatus, and
wherein the state determination unit
specifies a storage area corresponding to the service shown by the service identification information and an application corresponding to the service, on the basis of the service identification information, and
collates the specified storage area corresponding to the service with the storage area shown by the information showing the storage area, collates the specified application corresponding to the service with the application shown by the information showing the application, and determines the service-related state.

(5) The relay device according to any one of (1) to (4), wherein the first information further includes service identification information showing service, and
wherein the communication control unit causes the second information to be transmitted to the first external device that is a device corresponding to the service shown by the service identification information.

(6) The relay device according to any one of (1) to (4), wherein the communication control unit causes the second information to be transmitted to the first external device that is a device that transmits an information transmission request that requests transmission of information after the first information is acquired.

(7) The relay device according to any one of (1) to (6), wherein the first external device is a device used by an operator who makes a voice call with a user of the information processing apparatus having transmitted the first information, or a device that is able to transmit the second information to the device used by the operator.

(8) The relay device according to (7), wherein the communication control unit causes a voice call start request for starting a voice call with the operator, to be transmitted to the information processing apparatus having transmitted the first information.

(9) A relay method executed by a relay device, the method including control of communication with an external device,
wherein the control includes
maintaining a session with an information processing apparatus that transmits first information when the first information including specific information that is able to specify a calling party in a voice call is acquired by communication,
causing second information including the specific information included in the first information to be transmitted to a first external device,
specifying the information processing apparatus having transmitted the first information on the basis of the specific information included in acquired third information when the third information including the specific information and information for transmission is acquired from the first external device or a second external device after the second information is transmitted, and
causing information included in the third information to be transmitted to the specified information processing apparatus by the maintained session.

(10) An information processing system including:
an information processing apparatus; and
a relay device configured to be communicable with the information processing apparatus,
wherein the relay device includes a communication control unit configured to control communication with an external device, and
wherein the communication control unit
maintains a session with an information processing apparatus that transmits first information when the first information including specific information that is able to specify a calling party in a voice call is acquired by communication,
causes second information including the specific information included in the first information to be transmitted to a first external device,
specifies the information processing apparatus having transmitted the first information on the basis of the specific information included in acquired third information when the third information including the specific information and information for transmission is acquired from the first external device or a second external device after the second information is transmitted, and
causes information included in the third information to be transmitted to the specified information processing apparatus by the maintained session.

What is claimed is:
1. A relay device comprising:
circuitry configured to:
control communication with an external device,
maintain a session with an information processing apparatus that transmits first information when the first information including specific information that is able to specify a calling party in a voice call is acquired by communication,
cause second information including the specific information included in the first information to be transmitted to a first external device,
specify the information processing apparatus having transmitted the first information on the basis of the specific information included in acquired third information when the third information including the specific information and information for transmission is acquired from the first external device or a second external device after the second information is transmitted, and
cause information included in the third information to be transmitted to the specified information processing apparatus by the maintained session.

2. The relay device according to claim 1,
wherein the third information includes a processing request for performing predetermined processing as the information for transmission, and
wherein the circuitry is further configured to cause the processing request to be transmitted to the specified information processing apparatus.

3. The relay device according to claim 1,
wherein the first information further includes service identification information showing service, and information on a storage state of data in the information processing apparatus,
wherein the circuitry is further configured to
determine a service-related state in the information processing apparatus having transmitted the first information, on the basis of the service identification information and the information on the storage state when the first information is acquired, is further included, and cause second information including information showing the service-related state to be transmitted to the first external device.

4. The relay device according to claim 3,
wherein the information on the storage state is information showing a storage area of a recording medium included in the information processing apparatus and information showing an application installed in the information processing apparatus, and
wherein the circuitry is further configured to
specify a storage area corresponding to the service shown by the service identification information and an application corresponding to the service, on the basis of the service identification information,
collate the specified storage area corresponding to the service with the storage area shown by the information showing the storage area,
collate the specified application corresponding to the service with the application shown by the information showing the application, and
determine the service-related state.

5. The relay device according to claim 1,
wherein the first information further includes service identification information showing service, and
wherein the circuitry is further configured to cause the second information to be transmitted to the first external device that is a device corresponding to the service shown by the service identification information.

6. The relay device according to claim 1, wherein the circuitry is further configured to cause the second information to be transmitted to the first external device that is a device that transmits an information transmission request that requests transmission of information after the first information is acquired.

7. The relay device according to claim 1, wherein the first external device is a device used by an operator who makes a voice call with a user of the information processing apparatus having transmitted the first information, or a device that is able to transmit the second information to the device used by the operator.

8. The relay device according to claim 7, wherein the circuitry is further configured to cause a voice call start request for starting a voice call with the operator, to be transmitted to the information processing apparatus having transmitted the first information.

9. A relay method executed by a relay device having at least one processor, the method comprising control of communication with an external device,
wherein the control includes
maintaining a session with an information processing apparatus that transmits first information when the first information including specific information that is able to specify a calling party in a voice call is acquired by communication,
causing second information including the specific information included in the first information to be transmitted to a first external device,
specifying the information processing apparatus having transmitted the first information on the basis of the specific information included in acquired third information when the third information including the specific information and information for transmission is acquired from the first external device or a second external device after the second information is transmitted, and
causing information included in the third information to be transmitted to the specified information processing apparatus by the maintained session.

10. An information processing system comprising:
an information processing apparatus; and
a relay device configured to be communicable with the information processing apparatus,
wherein the relay device comprises circuitry configured to control communication with an external device,
wherein the circuitry is configured to
maintain a session with the information processing apparatus that transmits first information when the first information including specific information that is able to specify a calling party in a voice call is acquired by communication,
cause second information including the specific information included in the first information to be transmitted to a first external device,
specify the information processing apparatus having transmitted the first information on the basis of the specific information included in acquired third information when the third information including the specific information and information for transmission is acquired from the first external device or a second external device after the second information is transmitted, and
cause information included in the third information to be transmitted to the specified information processing apparatus by the maintained session.

* * * * *